US010757165B2

(12) United States Patent
Gangadharan et al.

(10) Patent No.: US 10,757,165 B2
(45) Date of Patent: *Aug. 25, 2020

(54) SYSTEM AND METHOD FOR DELEGATING SERVICE ENTITLEMENTS ACROSS MULTIPLE MEDIA SERVICES

(71) Applicant: UXP Systems Inc., Toronto (CA)

(72) Inventors: Praveen Gangadharan, Brampton (CA); Gemini Waghmare, North York (CA); Jay Deen, Toronto (CA); Jingyu Wang, Markham (CA); Ryan Morrison, Georgetown (CA)

(73) Assignee: AMDOCS DEVELOPMENT LIMITED, Limassol (CY)

(*) Notice: Subject to any disclaimer, the term of this patent is extended or adjusted under 35 U.S.C. 154(b) by 413 days.

This patent is subject to a terminal disclaimer.

(21) Appl. No.: 15/179,628

(22) Filed: Jun. 10, 2016

(65) Prior Publication Data

US 2017/0359345 A1    Dec. 14, 2017

(51) Int. Cl.
*G06F 7/04* (2006.01)
*G06F 15/16* (2006.01)
(Continued)

(52) U.S. Cl.
CPC .......... *H04L 67/02* (2013.01); *H04L 63/0281* (2013.01); *H04L 63/102* (2013.01);
(Continued)

(58) Field of Classification Search
CPC ..... H04L 63/10; H04L 65/102; H04L 67/306; H04L 67/02; H04L 65/1069;
(Continued)

(56) References Cited

U.S. PATENT DOCUMENTS

2004/0068567 A1* 4/2004 Moran .................... H04L 67/14
709/227
2013/0185784 A1* 7/2013 Tamura ............... H04L 63/0815
726/9

(Continued)

*Primary Examiner* — Trong H Nguyen
*Assistant Examiner* — Amie C. Lin
(74) *Attorney, Agent, or Firm* — Zilka-Kotab, P.C.

(57) ABSTRACT

A system and method are provided for delegating entitlements to media services. The method includes storing, at an intermediary system operable between a plurality of service providers and a plurality of user devices, authorization data for each of a plurality of media services associated with a first user, the authorization data enabling the intermediary system to access the corresponding media service from a service provider on behalf of the first user. The method also includes, after detecting a request to access one of the plurality of media services by a second user, using a set of stored associations to determine whether or not the second user has been delegated an entitlement to the one of the plurality of media services by the first user. The method also includes, after determining that the second user has the entitlement, using corresponding authorization data to access the one of the plurality of media services on behalf of the second user, via a communication interface between the intermediary system and the corresponding service provider.

17 Claims, 30 Drawing Sheets

(51) Int. Cl.
    *G06F 17/30*     (2006.01)
    *H04L 29/06*     (2006.01)
    *H04L 29/08*     (2006.01)

(52) U.S. Cl.
    CPC ........ *H04L 63/104* (2013.01); *H04L 65/1069* (2013.01); *H04L 65/4084* (2013.01); *H04L 67/306* (2013.01)

(58) Field of Classification Search
    CPC . H04L 65/4084; H04L 63/104; H04L 63/102; H04L 63/0281
    See application file for complete search history.

(56) References Cited

U.S. PATENT DOCUMENTS

| | | | |
|---|---|---|---|
| 2014/0020051 A1* | 1/2014 | Lu ...................... | G06F 21/6218 726/1 |
| 2014/0229737 A1* | 8/2014 | Roth .................... | H04L 9/0618 713/176 |
| 2015/0150106 A1* | 5/2015 | Lund ..................... | H04L 63/08 726/7 |
| 2015/0281119 A1* | 10/2015 | Olkha .................... | H04L 63/10 709/225 |
| 2016/0269237 A1* | 9/2016 | Higgins ................ | H04L 63/10 |
| 2017/0257377 A1* | 9/2017 | Vading ................ | H04L 63/104 |

* cited by examiner

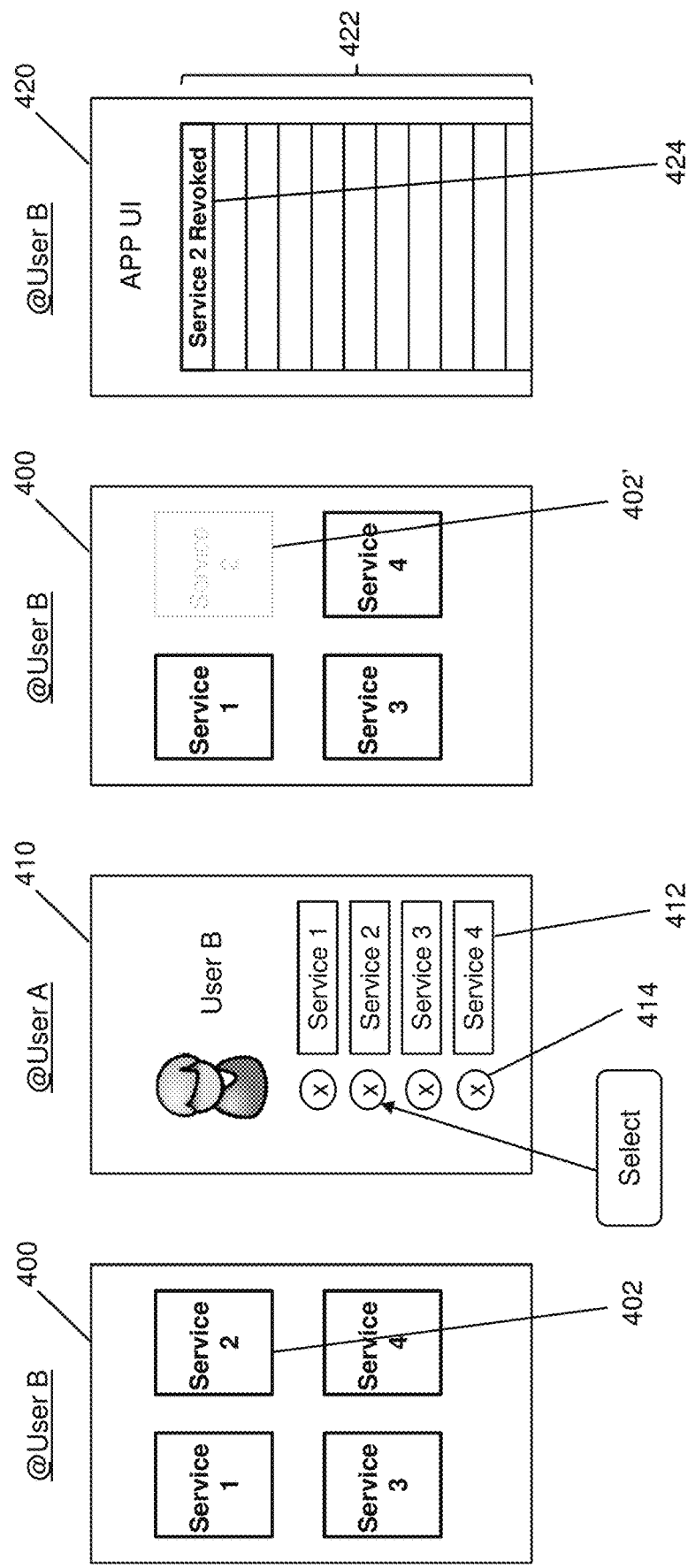

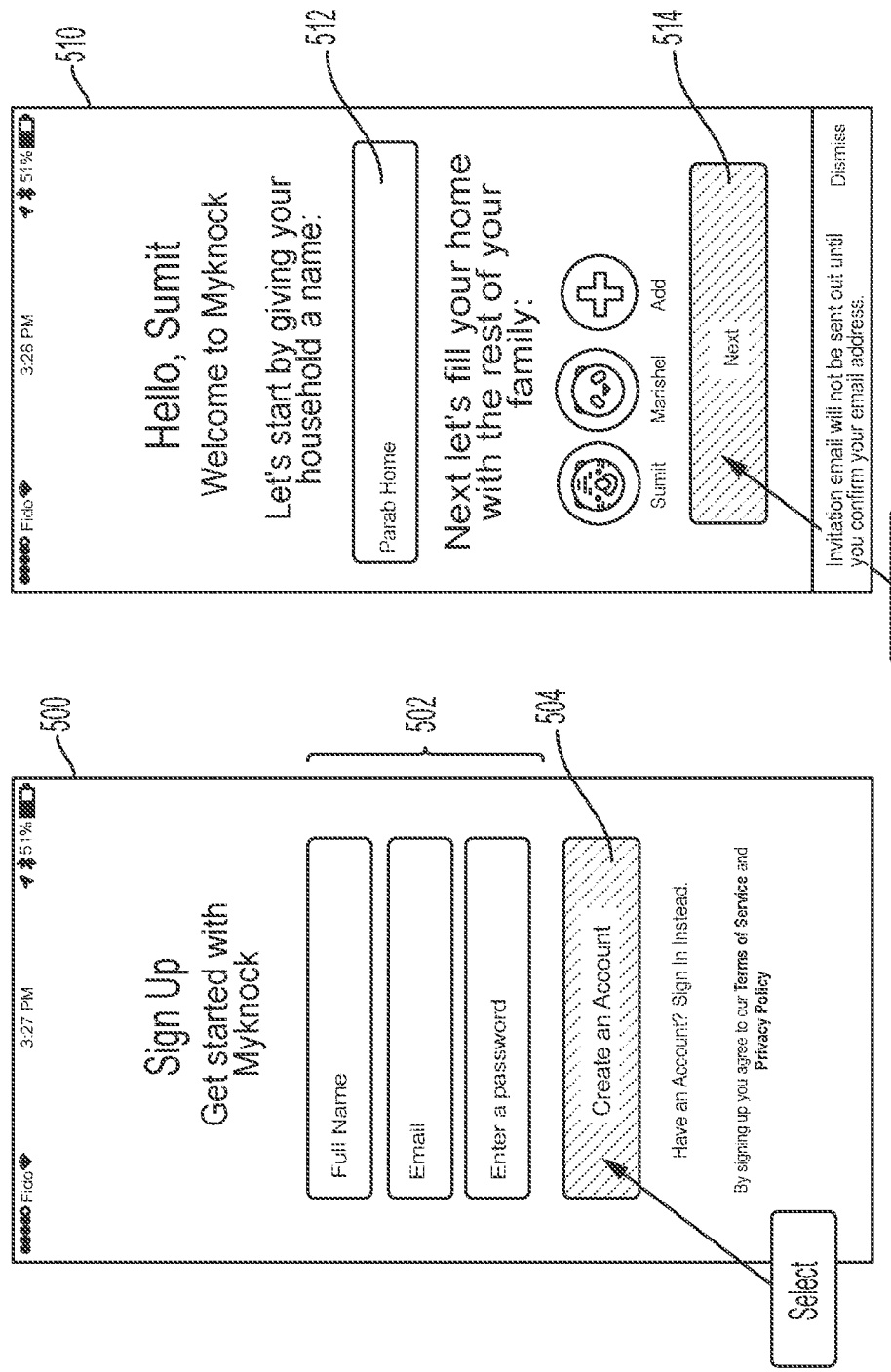

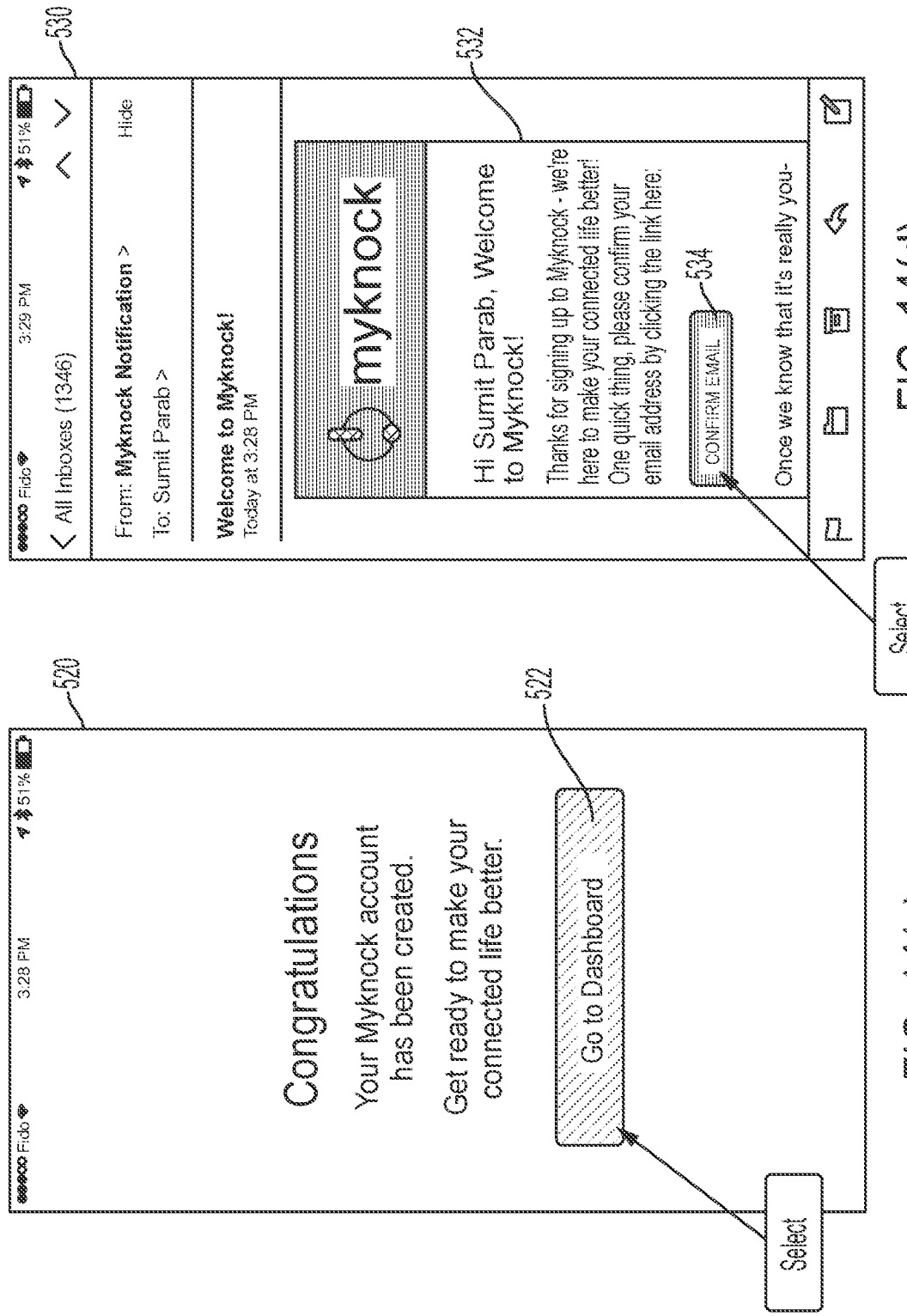

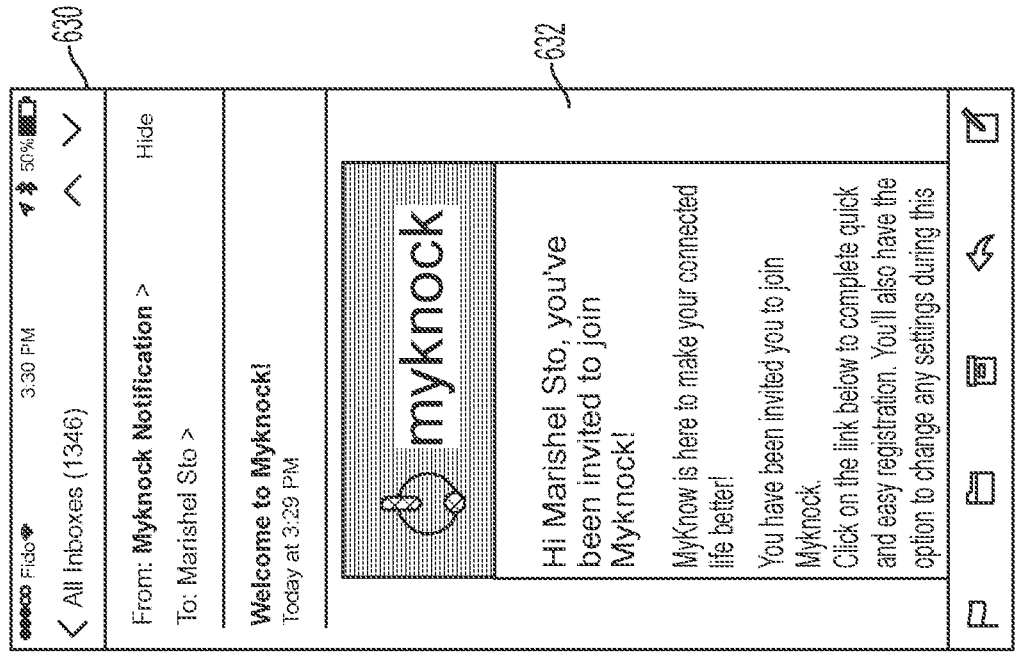
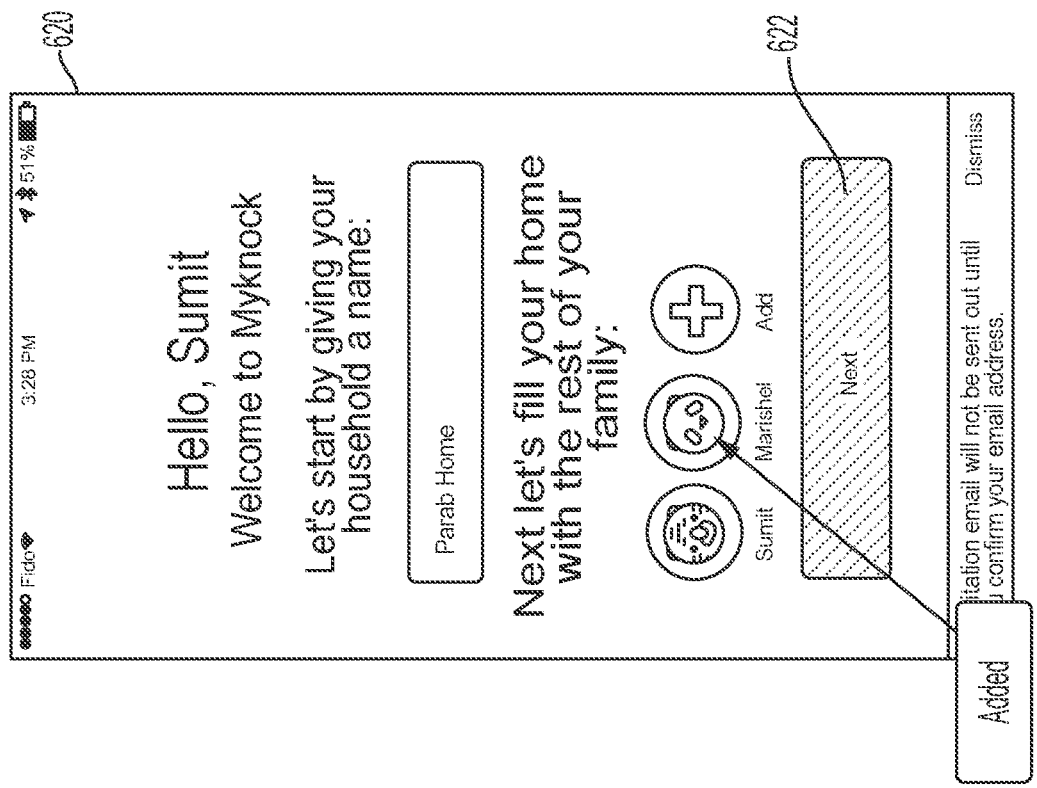
FIG. 15(c)
FIG. 15(d)

SYSTEM AND METHOD FOR DELEGATING SERVICE ENTITLEMENTS ACROSS MULTIPLE MEDIA SERVICES

TECHNICAL FIELD

The following relates to systems and methods for delegating service entitlements across multiple media services.

DESCRIPTION OF THE RELATED ART

Digital user behaviour is rapidly changing because of the proliferation of mobile devices and connected appliances, the reality of high-speed fixed and wireless networks, and the digital delivery of online applications and content. This change is driving new business challenges for digital service providers. The majority of these business challenges fall into two complementary areas, namely service delivery and user-centric personalization.

Many of the digital services offered today are rigidly tied to a single subscriber account. In today's digital world, subscriber account holders are given a single digital ID to access their service. A digital fitness service, for example, would allocate one digital ID, tied to a subscriber account, to track the user's physical activity. The entitlement to the service is tied a single individual; unless the user is willing to share their username and password. Moreover, digital services often exist in 'silos'. Silos are isolated systems that do not share user profile, preferences, or analytics information across a federated network. While single-sign on solutions allow a single user to login to a silo using another service's credentials, they do not allow the flexibility to share services among other users at a service, or feature based level. This also prevents the ability to personalize a shared service. For example, a cable television operator may offer a username and password for their video service to an account holder, but the account holder cannot delegate access to another digital user, nor allow that user to personalize their consumption features (e.g., favourite channels).

With the proliferation of IP-enabled services, users now expect digital services to be as individually interactive as they are personally seamless. Moreover, in an attempt to mimic the physical world, service providers have acknowledged that users do not consume services in isolation. Rather, they share access to services in groups like households and small businesses, and within those groups users further personalize services to their own preferences, to the extent they're entitled to do so (e.g., a child may decide to set a favourite TV channel to their profile, but only to the extent their parents have enabled viewable content)

Digital services are being enabled across an ever growing list of services, like fitness, home automation, travel and finance. They are also being support across an ever growing list of devices: from connected cars to home automation and lifestyle devices. In the process they are enabling a broad range of consumer and industrial services across a rapidly materializing 'Internet of Things' (IoT). In essence, next-generation television, and the IoT are embodiments of digital service provider roadmaps that require the introduction of new services, at a continually quicker pace, and tailored to digital Users.

It is an object of the following to address the above-noted observations and challenges.

SUMMARY

The following provides a system and method that enables entitlements to be delegated across multiple, siloed media services without having to share credentials with those to which the services are being delegated.

In one aspect, there is provided a method for delegating entitlements to media services, the method comprising: storing, at an intermediary system operable between a plurality of service providers and a plurality of user devices, authorization data for each of a plurality of media services associated with a first user, the authorization data enabling the intermediary system to access the corresponding media service from a service provider on behalf of the first user; after detecting a request to access one of the plurality of media services by a second user, using a set of stored associations to determine whether or not the second user has been delegated an entitlement to the one of the plurality of media services by the first user; and after determining that the second user has the entitlement, using corresponding authorization data to access the one of the plurality of media services on behalf of the second user, via a communication interface between the intermediary system and the corresponding service provider.

In another aspect, there is provided a computer readable medium comprising computer executable instructions for delegating entitlements to media services, the computer readable medium comprising instructions for: storing, at an intermediary system operable between a plurality of service providers and a plurality of user devices, authorization data for each of a plurality of media services associated with a first user, the authorization data enabling the intermediary system to access the corresponding media service from a service provider on behalf of the first user; after detecting a request to access one of the plurality of media services by a second user, using a set of stored associations to determine whether or not the second user has been delegated an entitlement to the one of the plurality of media services by the first user; and after determining that the second user has the entitlement, using corresponding authorization data to access the one of the plurality of media services on behalf of the second user, via a communication interface between the intermediary system and the corresponding service provider.

In yet another aspect, there is provided a method for accessing media services, the method comprising: requesting from an intermediary system, by an electronic device for a first user, access to one of a plurality of media services associated with an account for a second user, the intermediary system being operable between a plurality of service providers and a plurality of user devices, and storing authorization data for each of a plurality of media services associated with the second user, the authorization data enabling the intermediary system to access the corresponding media service from a service provider on behalf of the first user; and receiving the requested media service at the electronic device for the first user after the intermediary device has used a set of stored associations to determine whether or not the first user has been provided with an entitlement to the one of the plurality of media services by the second user, wherein corresponding authorization data is used by the intermediary system to access the one of the plurality of media services on behalf of the first user, via a communication interface between the intermediary system and the corresponding service provider.

BRIEF DESCRIPTION OF THE DRAWINGS

Embodiments will now be described by way of example only with reference to the appended drawings wherein:

FIGS. 13(a) to 13(d) illustrate a series of screen shots illustrating a real-time user interface (UI) update and notification process upon detecting a change in service entitlements;

FIG. 14(a) is a screen shot of an example of a user interface for signing up with the entitlement delegation system;

FIG. 14(b) is a screen shot of an example of a user interface for naming a household group;

FIG. 14(c) is a screen shot of an example of a user interface for accessing a dashboard for a newly created household group;

FIG. 14(d) is a screen shot of an example of a user interface for viewing a sign-up notification and confirmation message;

FIG. 15(c) is a screen shot of an example of a user interface showing the addition of a new user to the group;

FIG. 15(d) is a screen shot of an example of a user interface for viewing an invitation notification message for a new user added to a group;

DETAILED DESCRIPTION

Figure 1:
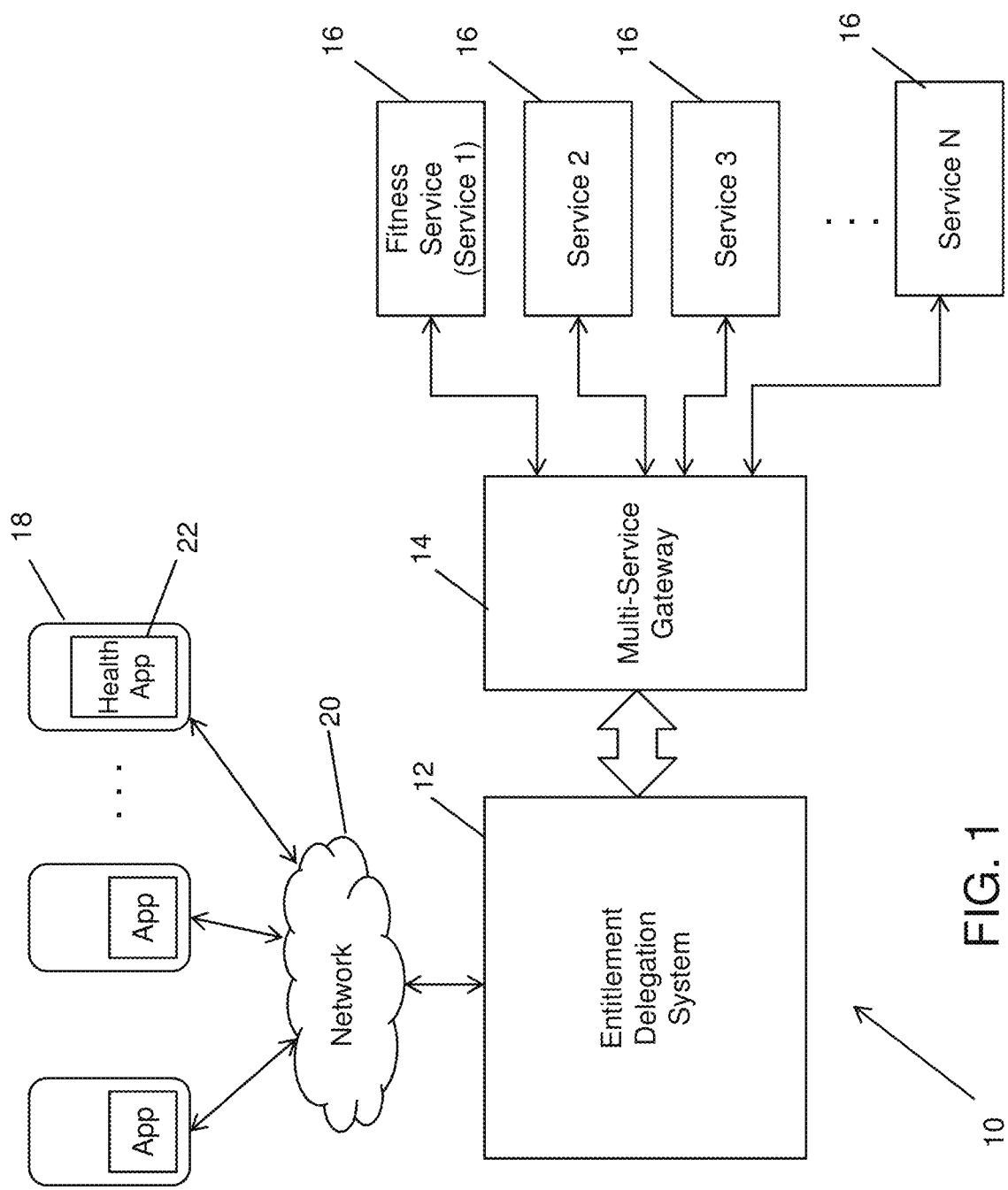
FIG. 1 is a schematic block diagram of a media service platform that enables service and feature level entitlement delegation across services and among users in a group.

By attaching single subscriber accounts to groups that can then enable sharing between users, and further associating specific services and profiles to each digital user, service providers can enable true service personalization. This personalization gives each user within a household (or other group or organization) seamless access to their own set of services, and to share services that may be tied to another user. This enhances discovery, recommendations, preferences, and service usage itself. This leads to stickier and more profitable relationships. Combining this capability with a service integration layer enables service providers to quickly add other siloed digital services. This dramatically changes the digital service consumption experience for users, their services, and the other digital users with whom they interact.

The system described herein enables users to federate many services while being able to use a single login to access these services, and provides an ability to delegate these capabilities to authorize others to use the services (and features thereof) as if the service was dealing with the actual account holder. Moreover, the platform described herein provides these capabilities whether or not the particular service being delegated itself allows delegation. In this way, the currently rigid associations between services (whether or not they are federated with other services) and account holders can be removed allowing entitlements to be delegated, across multiple services, and even at a feature level within a particular service.

To use the IoT as an example, the system and methods described herein enable an adult to delegate full access to a digital home security service to their spouse's digital ID. Going further, it would enable these adults, as parents to have granular, user-level control over their household automation. A child, for example, could be granted permission to lock and unlock the front door from a mobile device, but denied permission to change the thermostat settings.

Traditional service delivery platforms and identity management systems that have aimed for similar objectives have been found to be lacking in providing user-centric access and personalization across services, while implying significant customizations to legacy applications, which are time and resource intensive. Satisfying these new business requirements in existing digital service provider environments requires the consideration of new software enablers to assure future roadmaps.

The following provides a software engine and platform that manages the digital user lifecycle and enables delegation of entitlements across multiple services and across features of those services to groups of users. The system can be deployed in an existing digital services provider's information technology (IT) and network application environment. The system provides a foundation for service providers wishing to transform towards digital user "journeys". A digital journey describes how a user interacts with an online service using a digital device such as a smartphone or a mobile tablet. By implementing the system in this way, service providers can enable enterprise-level personalization across multiple screens and devices. This implementation simplifies the digital journey, reconsolidates services around digital users, and personalizes the digital service experience.

It is recognized that companies that provide online services aim to create digital relationships with their users. This can result in one user having many digital identities. It can also result in a service being entitled to only one digital user. The current siloed nature of service providers makes this multi-identity experience a reality for the digital user, which has led to the need for user identity reconsolidation. The lack of flexibility in subscriber account IT systems being able to delegate services to secondary users is also a reality for the digital user. The system described below operates to unify this fragmented experience for users, by enabling seamless access to core services (along with a multitude of third-party cloud services). Unifying services in this way includes orchestrating access to a number of end points (via a number of protocols). It also includes effectively delegating shared and personal services to individual users. This allows each household member to have secure and personalized access on any device, and to share access without sharing credentials, including passwords. This federation is thus made a user-centric reality within the context of a pre-existing subscriber account relationship with a digital service provider. In addition, the multiservice gateway described herein permits the flexible registration, federation and delegation of any service against an individual user of the system, which permits unified access to any number of cloud or service provider core services.

Turning now to the figures, FIG. 1 illustrates an intermediary system, hereinafter referred to as a media service platform 10 (or platform 10 for brevity) that includes an entitlement delegation system 12 and a multi-service gateway 14. The multi-service gateway 14 provides access to a plurality of services 16 that are made, at least in part, accessible to user devices 18 connectable to the entitlement delegation system 12 via a network 20. The user devices 18 have installed thereon (or have access to, via a browser or other portal) an application (app) 22 that enables users to access the services 16, consume the services 16, and control/delegate (or have controlled) entitlements to those services 16 and/or features provided within those services 16.

In the examples shown in FIG. 1, a fitness service 16 is accessible by a health app 22 running on a user device 18 via providing the fitness service's login credentials for a specific user. Other examples are a service 16 associated with one or more devices or appliances in a home, a service 16 that is associated with a vehicle or device installed therein, incorporating access to a service 16 associated with media content, such as a television, internet, music or video streaming service, digital publisher, etc.

The platform 10 enables users who have pre-existing accounts and subscriptions to various services 16 to delegate to other users, their entitlements to those services 16, or features of those services 16 without having to share credentials such as usernames and passwords. This can be done across multiple services and with associations among multiple groups and user types (e.g., via specified user roles).

The entitlement delegation system 12 can also be considered a user lifecycle management (ULM) entity that provides software functionality and business processes to create and manage users and groups, and to seamlessly associate, access, share and delegate digital services via the service gateway 14. While the entitlement delegation system 12 and the multi-service gateway 14 are delineated in the configuration shown in FIG. 1, it can be appreciated that the platform 10 can provide equivalent functionality using any one or more computing entities.

Figure 2:
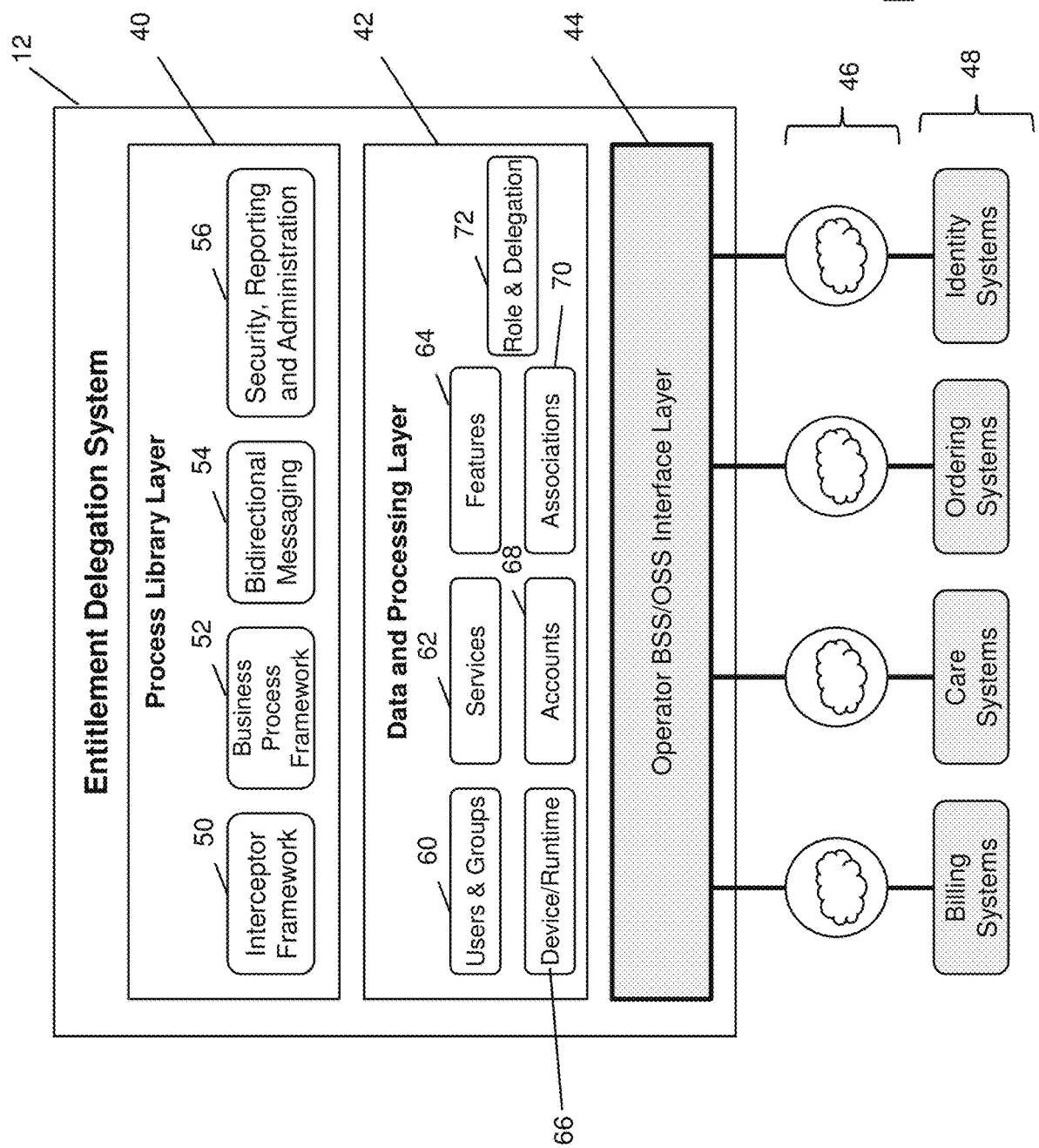
FIG. 2 is a block diagram of an example of a configuration for the entitlement delegation system shown in FIG. 1.

FIG. 2 illustrates an example of a configuration for the entitlement delegation system 12. The entitlement delegation system 12 in this example includes a process library layer 40 that enables the application logic for digital user journeys, a data and processing layer 42 that manages the core data and user associations, and an billing support system (BSS)/operations support system (OSS) interface layer 44 that interfaces with IT systems 48 via cloud or other network connections 46. Examples of such systems 48 include billing systems, care systems, ordering systems, and identity systems. The process library layer 40 includes an interceptor framework 50, a business process framework 52, a bi-directional messaging component 54, and security, reporting and administration component 56. The data and processing layer 42 includes a user's and groups module 60, a services module 62, a features module 64, a device runtime module 66, an accounts module 68, an associations module 70 and a role and delegation module 72.

The entitlement delegation system 12, in addition to managing service entitlements among users of the platform 10, can be deployed into a service provider's core IT and network application environment to provide user lifecycle management. The system 12 operates with the multi-service gateway 14 to provide software functionality and business processes to enable user-centric experiences. These components also seamlessly integrate and expose digital services to any number of user end-points (i.e., devices 18). In this way, a vertical information technology platform is provided, which extends the capabilities of existing billing, identity management, and provisioning systems to provide for full digital user lifecycle management. Additionally, a horizontal network service platform is provided that crosses core service application domains and unifies the federation of these services around individual users and their devices 18. Optionally, the platform 10 also provides a user-centric service exposure layer allowing the integration of these services into a digital user experience interface.

BSS/OSS applications (e.g., Identity Management (IdM), entitlement, and provisioning systems) are typically resident in IT departments prior to deploying the platform 10. Rather than replacing these BSS/OSS applications, the platform 10 extends them to support the end-to-end lifecycle for digital users, their profiles, and the seamless access and personalization of services around these users. Regardless of the prior existence of IdM systems, most operators do not manage one-to-one relationships with users. Rather, they use these IdM systems to store a single username and password pair for a single subscriber account. While these IdM systems may eventually be used to store multiple individual identities for a household, they do not provide flexible role management to recognize the subscriber account holder. They also are found to lack a library of operator-specific processes to facilitate the creation of users, groups and sub-users. To ensure careful implementation, the platform 10 can include adaptors for integration and mapping to the following systems:

Billing Systems: These systems act as the source and master for subscriber accounts and subscription data. These have their own, modular provider interfaces inside the platform 10.

Identity Management Systems: These systems may master authorization and authorization data based on subscriber accounts.

Provisioning Systems: These systems update services with subscription related entitlements.

CRM Systems: These systems provide administrative personnel with reporting and management functions.

These functions also require the management of individual users and their service profiles by the platform 10.

Once the entitlement delegation system 12 is implemented, every member in a hierarchical household can have a credentialed profile accessible across devices 18 and services 16. Since operators have existing and expensive investments in core applications, including voice, video, home control and other services, these are particularly suitable candidates for initial integrations with the platform 10. New and ever-growing OTT services that bring music, wellness, weather, and other experiences from the cloud are also important integrations for Next Generation TV and Connected Life initiatives. The multi-service gateway 14 also enables the abstraction of the underlying functionality of an integrated service 16, permitting the exposure of that service's APIs via a user-centric API brokered by the entitlement delegation system 12. This facilitates the operator's desired end-state: a single enterprise user-hub that brokers user-centric access to underlying services 16 via one, common API set.

The interceptor framework 50 is used for implementing business process logic for user lifecycle management functions including creating users and groups. The interceptor framework 50 is also used to add business processes end users and administrators would leverage to manipulate entitlements for users (e.g., delegation of a service entitlement from one user to another)

The business process framework 52 is used to inject step-based workflow based functions into business process logic for user lifecycle management including creating users and groups. For example, a user may be prompted to enter a challenge credential prior to being permitted to delegate a service entitlement to another user. The business process framework 52 would enforce that the correct answer be provided prior to the delegation being permitted.

The bidirectional messaging component 54 is a mechanism that enables the real-time exchange of messages between platform clients. The client applications 22 in this context include the device-based and third-party applications using the entitlement and delegation services, or services enabled by the system 12. For example, a homeowner may decide to revoke a service entitlement delegated to a tenant which allows them to use a home automation service. The bidirectional message component ensures that this revocation occurs in real time, resulting in immediate removal of the service entitlement The bidirectional messaging component 54 enables client applications to explicitly register to the messaging service after successful authentication to the entitlement delegation system 12. Messaging service registration is used to determine the presence of the client, and the user associated with that client.

The bidirectional messaging component 54 sets up dedicated message queues per client, and assigns topics to each message to ensure the reliability and timeliness of message delivery.

Security, reporting and administration component 56 is encompasses components standard in enterprise-grade software platforms. Security assures the platform against unauthorized entry, as does it log and maintain a record of authorized use for audit purposes. Reporting provides a visual presentation of data gathered by the system, and administration provides operators of the platform to manage various elements of the overall Entitlement Delegation system.

The user and group module 60 provides comprehensive services for the enrolment and management of digital users within an existing household (or billing account). This module 60 provides APIs and application functions for full create-read-update-delete (CRUD) functions to manage credentialed digital users and their entitlements. Each digital user of the platform 10 is stored with a unique identifier that is independent of user-provided identifiers (such as e-mail addresses or profile names). This unique identifier provides the key value for the association of a digital user identity with other operator core and public cloud identities of the same user.

In addition to the primary information (such as the digital user's name and login credentials), the entitlement delegation system 12 can store a uniform resource locator (URL) for the user's 'avatar' image. The avatar URL could point to either a publicly accessible file, or to a file that the user has previously uploaded to the platform 10 using a secure file upload feature. The entitlement delegation system 12 also provides the ability to add operator-defined attributes to the user entity based on business needs. A user enrolment process can also be provided, which supports the integration of online identities such as social media credentials (used as the means of user login). Images from the associated social media accounts can also be used as the digital user's avatar image.

Users and groups module 60 can also include a comprehensive set of group management functions. These functions allow entities such as users, accounts, subscriptions, and devices 18 to be organized into groups. This provides the ability to set common preferences and attributes for a group while simultaneously maintaining individual metadata for each entity. The grouping of entities is accomplished through associations as will be explained in greater detail below. This enables entities to be part of multiple groups. For example, user John Smith could be the Primary User of the 'Smith Home' household group, while being a sub-user in an 'Office' business group. That user would be able to use his TV subscription as a member of the household group and use his VoIP phone as part of the office business group. Group management for users overlays the concept of roles (primary user, administrator, sub-user etc.) into the association to allow for household and account hierarchies. Groups can also be treated as a single entity for performing various operations, such as notifications.

Runtime management (RM) using module 66 provides the ability to identify, manage, and personalize a user experience on a runtime endpoint (a specific device 18) through the following functionality.

RM module 66 can capture information about each physical endpoint device 18 for fine tuning the user experience delivery. This information includes its attributes (for example, the user-defined device name), its hardware or software (for example, OS version), and its capabilities and statuses (for example, whether it is connected to the system 12).

RM module 66 can also provide the capability to limit the number of devices 18 that can be associated with an account, subscription or user (or vice-versa). This limitation can be imposed based on the operator's business rules.

Account, subscription and feature management (using, for example, modules 62, 64, and 68) is based on a service model, and provides the ability to represent and maintain various aspects of services on the platform 10. The entitlement delegation system 12 can include an API that manages the creation and upkeep of data about billing accounts, subscriptions to services, and features of services. The entitlement delegation system 12 assigns unique internal identifiers to these entities while facilitating the storage of additional attributes (internal or external) related to the entities. Depending on the architecture of the specific platform deployment, the service-related data could be acquired by invoking an interface to the service provider's IT systems, the cloud service provider's API, or via the provisioning APIs of the entitlement delegation system 12. In conjunction with association management (via the associations module 70), a subscription and feature map can be used to determine the specific services and functionality that the user will be able to consume.

In the platform 10 described herein, an association represents a relation between two entities. For example, the eligibility of a user to access represented digital phone service by three associations to the user entity: the first to the billing account that includes the phone subscription, the second to the phone subscription itself, and the third to the voicemail feature which may reside in another system. The associations can also be further qualified by attributes that provide more information and fine grained control on the relation. Associations are important in providing identity federation and delegation functionality. This functionality also enables the self-discovery and association feature of the multi-service gateway 14, which is described in greater detail below.

A primary identifier of a user can be held by the entitlement delegation system 12, in an internal data store. In a typical deployment, the system 12 also stores the login credentials of the user and can provide a username and password based authentication. Service providers may configure password encryption from a variety of available hash methods. Third-party authentication via LDAP, SAML and OpenID can also be provided, depending on the specific deployment of the platform. Authentication via various third party platforms, such as social media (e.g., Facebook, Twitter, Google+, etc.) can also be included. Once authenticated, the information related to the user's profile, as well as various services and features associated with the user, can be fetched via a system API.

A session-level token based authorization can also be provided to clients interacting via the APIs. This token would be valid for authenticating requests to other components of the platform 10, such as the multi-service gateway 14 and the SAMs 90 (see also FIG. 3 described below). The token would be used to contain the user information that is used to validate the authenticity of operations that a client system attempts to perform on the platform 10. Also, a business rule driven access control mechanism can be applied to various entities and operations. For example, a user associated only to Account A would not necessarily have access to the information related to Account B (or its associated entities). The security of data can be further enhanced by controlling the access to data and operations. This can be based on flags defined on an association between the user and the other entity. By utilizing the interceptor framework 50, operators can further enhance the authentication process by intercepting the authentication requests to inject additional business logic.

As part of identity federation, the entitlement delegation system 10 can interact with various systems within and outside an operator's IT infrastructure for authentication and authorization. A typical example would be the OAuth based authentication and authorization required to associate and interact with, for example, Facebook services. As such, a framework can be provided for performing authentication and authorization via protocols such as OpenID, OAuth, and SAML.

The platform 10 can also provide the ability to authenticate a user using an alias. For example, if a user has set his/her email address as the primary identifier, (s)he can add other unique identifiers such as a telephone number as an alternative identifier. This would enable the user to login using the email address+password combination from, for example, a desktop computer while logging in using the telephone number+password (the same password) from the user's mobile phone.

In order to prevent unauthorized access to specific APIs, a source IP based whitelisting can also be made available on the platform 10, to ensure that certain types of transactions, for example, provisioning, can be performed from specific IP addresses or subnets.

Figure 3:
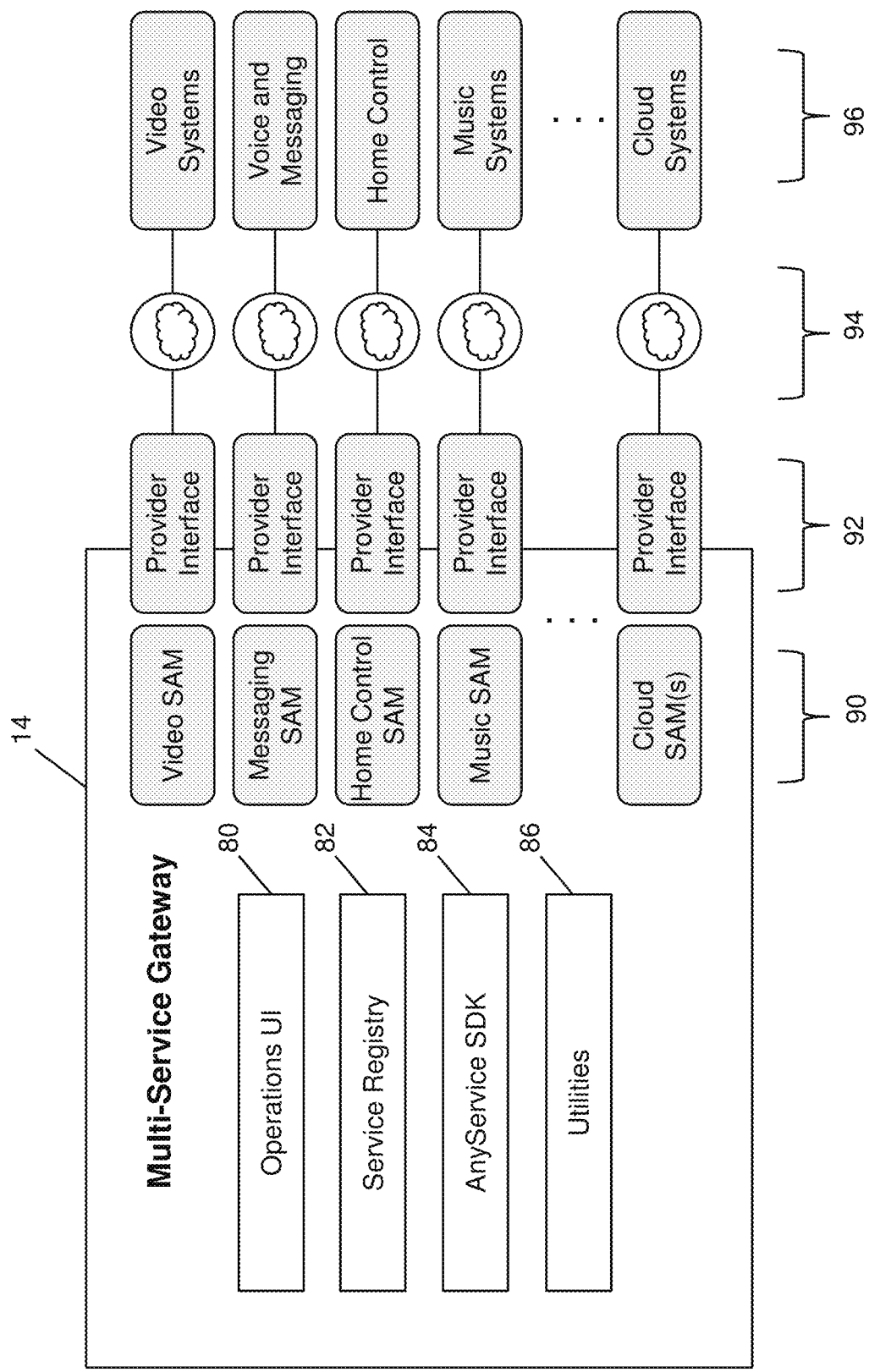
FIG. 3 is a block diagram of an example of a configuration for the service gateway shown in FIG. 1.

Turning now to FIG. 3, an example of a configuration for the multi-service gateway 14 is shown. The multi-service gateway 14 can be considered an integration layer that allows third party services to leverage the entitlement delegation system 12.

The multi-service gateway 14 in the configuration shown in FIG. 3 includes an operations UI 80, a service registry 82, a software development kit (SDK) 84, and a utilities module 86. The multi-service gateway 14 also includes one or more SAMs 90, each being associated with a service/account provider interface 92, both of which are associated with a corresponding system 96. The systems 96 correspond to the accounts, subscriptions, services, and features for which entitlement delegation is enabled using the platform 10. In the example shown in FIG. 3, are systems 96 for video, voice and messaging, home control, music systems, and cloud systems. The provider interfaces 92 enable the entitlement delegation system 12 to query APIs in systems 96 for users who have subscriber accounts in these systems and also via delegated users of these subscriber users. This allows delegated users to access services registered to other subscribed users without needed to know the subscribed user's credentials (e.g. usernames and passwords). In this way, user lifecycle management and service/feature delegation can be provided to systems 96 that do not have this capability. That is, current household or single-user based accounts and subscriptions can be left alone but augmented to provide additional functionality and granularity among the services 16 and features of those services 16.

The SAMs 90 provide application logic for the discovery, association, and authentication of a service by a platform-managed user. The SAMs 90 also provide a general abstraction of the underlying service 16, thus allowing that service's features and attributes to be mapped to a user of the platform 10. The provider interfaces 92 can be considered a component of the corresponding SAM 90, which is used to provide a specific platform-to-application vendor adaptor to govern the integration of the service 16 and its features to the SAM 90. It can be appreciated that there can be multiple provider interfaces 92 for each SAM 90. The SAMs 90 and their provider interfaces 92 can be made available pre-packaged for an operator deploying the platform 10, and new ones may also be developed using the SDK 84.

The multi-service gateway 14 is therefore an extensible gateway that allows various existing core service or new cloud services to leverage user lifecycle management and entitlement delegation, by managing the interface between the entitlement delegation system 12 and the SAMs 90.

The operations UI 80 provides the overall lifecycle management of a given SAM 90, including its global or selected availability to users and the transition of SAM states (e.g., Registered, Unregistered, Starting, Stopping, etc.). Since each SAM 90 is isolated from other SAMs 90, and from the entitlement delegation system 12, it may be managed in a lifecycle by itself. This allows for the efficient introduction, retraction, or state management of SAMs 90 without affecting other services and enabling a scalable platform 10.

The service registry 82 provides a published registry of services 16 integrated with the entitlement delegation system 12, and their associated states. The service registry 82 provides an API that allows external systems to retrieve a list of available services 16 via the multi-service gateway 14. The service registry 82 can also provide secure keys for the binding of services to the multi-service gateway 14, and ensures the secure communication between the platform 10, and downstream services 16.

The AnyService SDK 84 provides a set of tools and documentation for the third-party creation of SAMs 90, and their underlying components. Combined with the entitlement delegation API and the multi-service gateway APIs, the SDK 84 assists developers in building SAMs 90 and integrating them into the platform 10 in an efficient manner.

The SAMs 90 can include pre-packaged data model abstractions and interfaces to connect operator and third-party services 16 to the entitlement delegation system 12. In turn, the SAMs 90 expose a multiservice user-centric API. A SAM 90 can include any combination of the following elements: a data model abstraction of the underlying service 16; any required business logic required to abstract, normalize, or provide access to the underlying service 16; one or more provider interfaces 92, which provide vendor-specific adaptors to allow for communication between the platform 10 and the underlying service 16; a set of user-centric RESTful Service APIs that are exposed by the multi-service gateway 14; and a user-centric reference UI for the underlying service 16, to allow for rapid implementation of personalized user experiences by the operator. SAMs 90 can vary in complexity depending on various factors. These factors can include the complexity of business rules governing the service, the policies related to data caching, and the number of provider interfaces 92 required (among others). However, the AnyService SDK 84 provides a robust framework by which all of the above could be implemented in a short timeframe.

Once the foundational functionality is implemented, every member in a roles-based group or household can have a credentialed profile accessible across devices 18 and services 16. Value is then derived from the association and federation of services 16 around individual users to drive seamless, personalized experiences. As discussed above, since operators have existing and expensive investments in core applications, including voice, video, home control and other services, the platform 10 described herein is particularly advantageous. The multi-service gateway 14 also enables the abstraction of the underlying functionality of an integrated service 16, permitting the exposure of that service's APIs via a user-centric API brokered by the entitlement delegation system 12. This facilitates the operator's desired end-state: a single enterprise user-hub that brokers user-centric access to underlying services via one, common API set.

Figure 4:
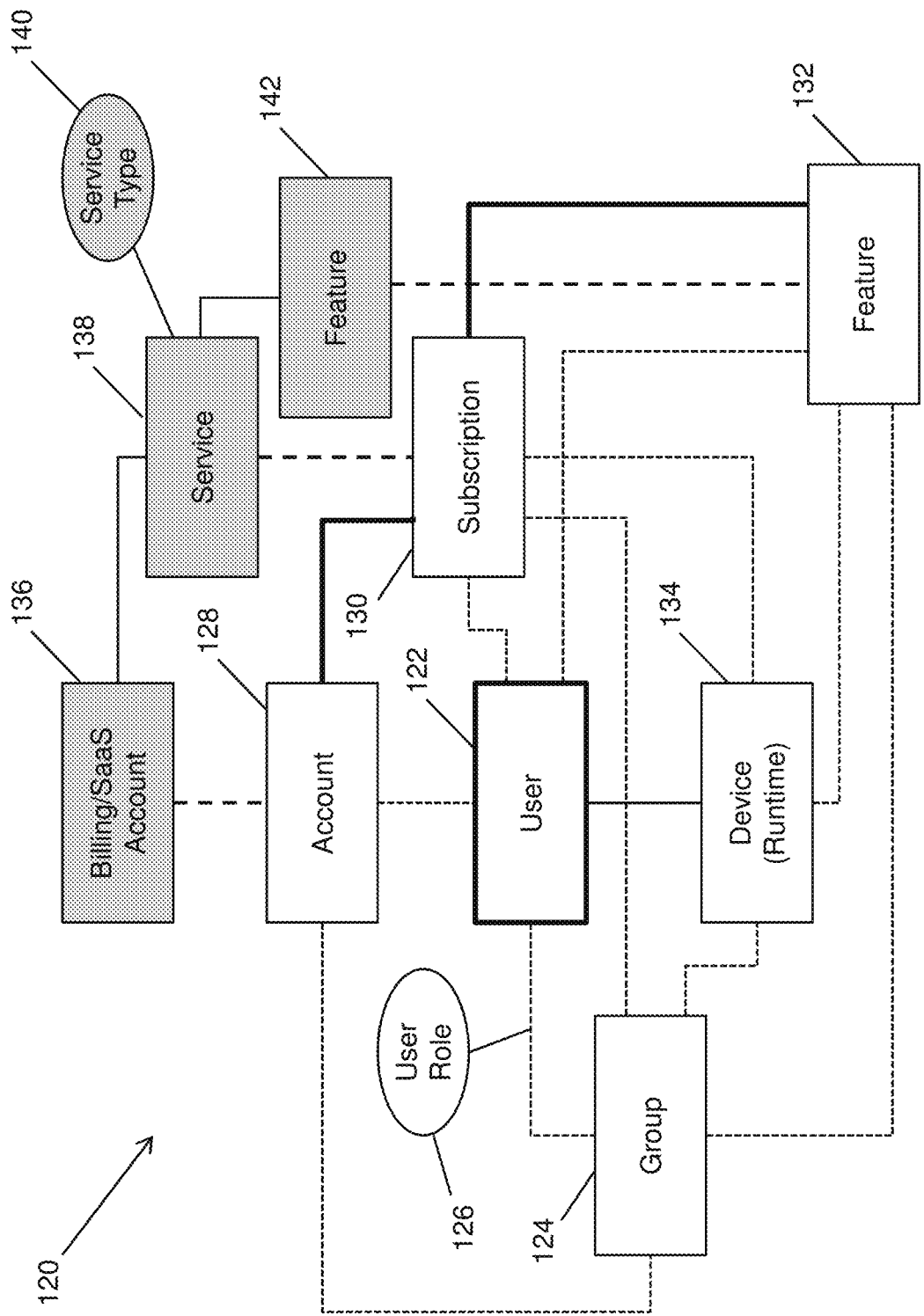
FIG. 4 is a schematic flow diagram illustrating a data model and associations between entities in that model.

The associations 70 stored by the entitlement delegation system 12 (e.g., as shown in FIG. 2), each correspond to a connection between certain entities according to a data model 120, illustrated in FIG. 4. The data model 120 in the example configuration shown in FIG. 4 includes at its core, a user 122. Each user 122 can be related to a group 124 and within that group 124 have a user role 126, such as owner, administrator, or simply a "delegated" or "entitled" user. The user 122 can also be associated with one or more accounts 128 (only one account is shown in FIG. 4 for ease of illustration). Each account 128 is associated with one or more subscriptions 130 provided in accordance with the terms and entitlements of that account 128. For example, an account 128 with a telecommunications provider may have a home phone subscription 130, and internet subscription 130, a cable or satellite television subscription 130, and a wireless device subscription 130 (again, only one subscription 130 is shown in FIG. 4 for ease of illustration). The data model 120 also includes one or more features 132 that are associated with each subscription 130. For example, the digital phone subscription 130 may include voicemail and call display features 132; or the wireless device subscription 130 may include data and voice features 132. The associations between various entities shown in FIG. 4 enable different entitlements to be delegated to different users 122 that can be associated with one or more groups 124 as will be illustrated with several examples below. The data model 120 also includes one or more device (runtime) 134 entities that correspond to different device types, thus allowing a device-level control of the usage of different services 138 and features 142.

As shown in darkened blocks in FIG. 4, the account 128 entity of the data model 120 has a corresponding billing/SaaS account 136 in the third party service provider's realm. Similarly, the subscription 130 entity in the data model 120 likewise has a corresponding service 138 (and possible a service type 140), and the feature 132 has a corresponding feature 142 in the third party service provider's realm. By mirroring these accounts 136, services 138, and features 142 within the data model 120, the multi-service gateway 14 can be used to provide granular delegations, down to the feature level without the existing services 16 being aware of this additional control and flexibility. It can be appreciated that a service may be referred to using the numerals 16 or 138 interchangeably, either or both of which referring to the physical or virtual service itself, or the data model abstraction thereof.

Figure 5:
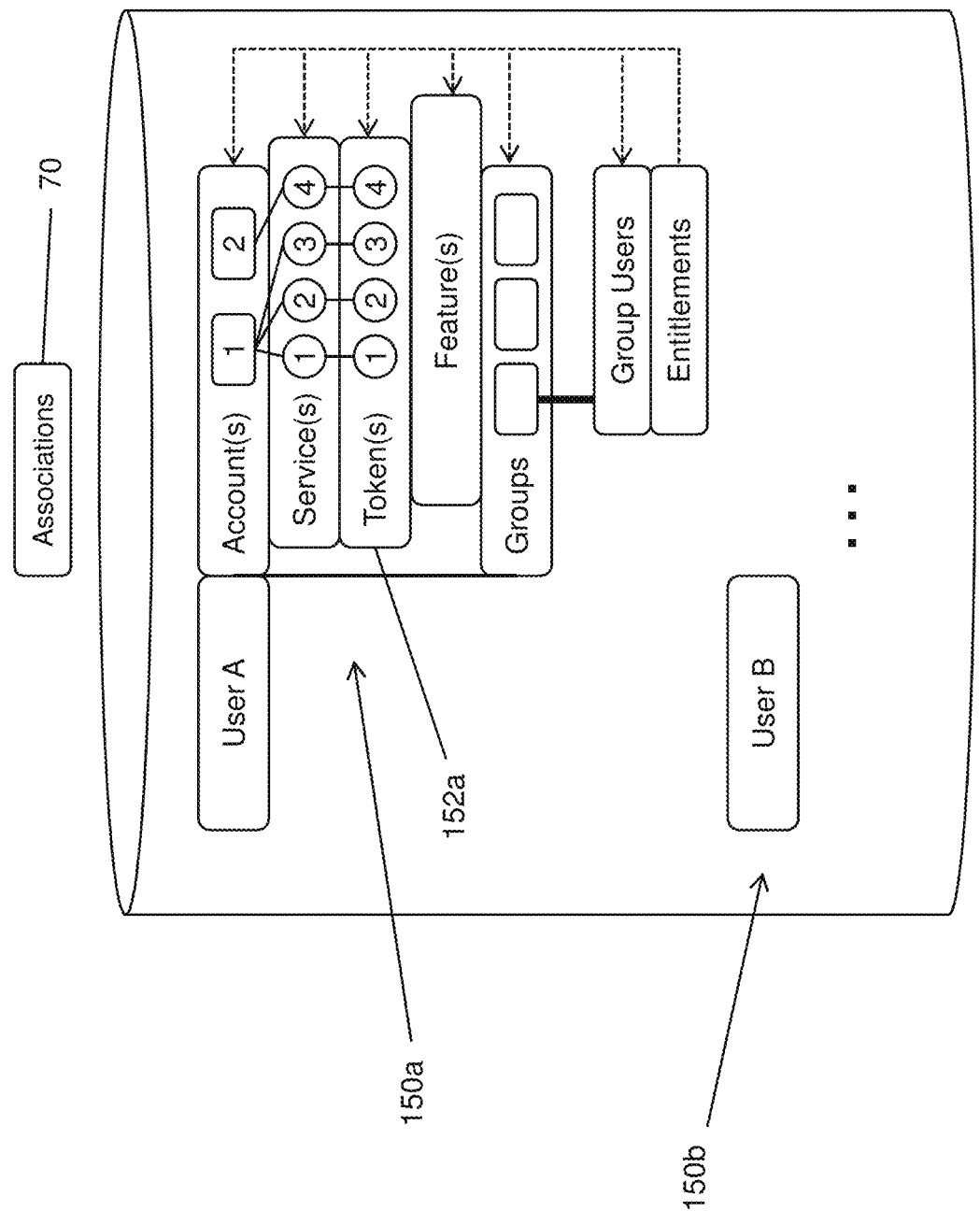
FIG. 5 is a block diagram of an example of an associations database.

By having the associations 70 stored and mapped within the data model 120 as depicted in FIG. 4, when a new user is added to a group 124, the eligibility to have the various Accounts, Subscriptions, Features and Devices entitled to other users of that group, is inherited. For example, if a new member is added to a household group, they will inherit the eligibility to have Accounts, Services, Features and Devices entitled to another user in that group, entitled to them. The actual granting of the entitlement, however, will be determined by the user to whom the Account, Service, Feature or Device is subscribed, and the associated user lifecycle business processes implemented in the platform 10. The associations 70, embodied as a database or other data storage mechanism is shown in FIG. 5, in which the relationships and connections shown in FIG. 4 can be stored and be accessible on a user-by-user basis. It can be appreciated that the visualization shown in FIG. 5 is for illustrative purposes only and various other data storage and retrieval mechanisms are possible within the principles described herein. A user entry 150, e.g., entry 150a for User A includes associations 70 for two accounts 128, namely Account 1 and Account 2 in this example. A number of services 16 (with corresponding subscriptions 130) are also associated with User A, and in this example Services 1, 2, and 3 are associated with Account 1, and Service 4 is associated with Account 2. Each service 16 has a corresponding token 152a that is used by the multi-service gateway 14 to access the corresponding service 16 on behalf of the owner of the account 128/136.

The tokens 152 can include a URL or other data that enables a service to be accessed in lieu of the username and password. Such tokens 152 are typically obtained by providing the user's credentials that are specific to the service provider, allowing the service provider (or a third party service) to generate the tokenized "authorization data" to avoid entry of, for example, a username and password each time the service 16 is to be accessed. It can be appreciated that tokens 152 are only one mechanism used for illustrative purposes and any pre-authorized access control mechanism is possible.

The user entry 152a also includes a number of features 132 and groups 124 that are likewise associated with User A. The groups 124 can include other group users and corresponding entitlements in accordance with their user role 126.

If User A, for example, were to invite User B to a Group, User B would inherit the eligibility to have Accounts 1 and 2, Services 1,2,3,4 or the associated Features, delegated to him. User A could then delegate (and later revoke), entitlements for these Accounts, Services and Features.

Figure 6:
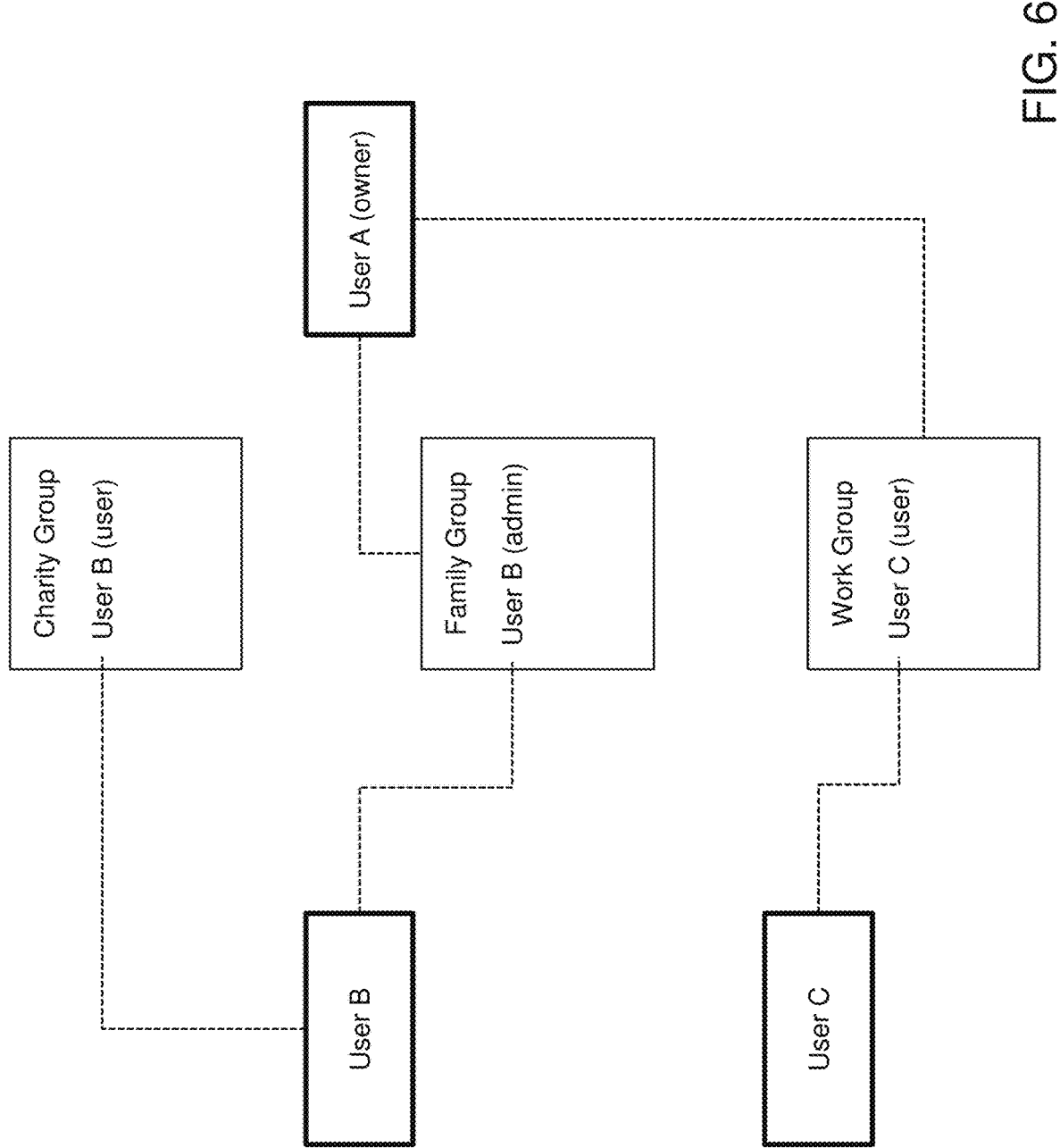
FIG. 6 is a flow diagram illustrating an example of user-group associations.
Figure 7:
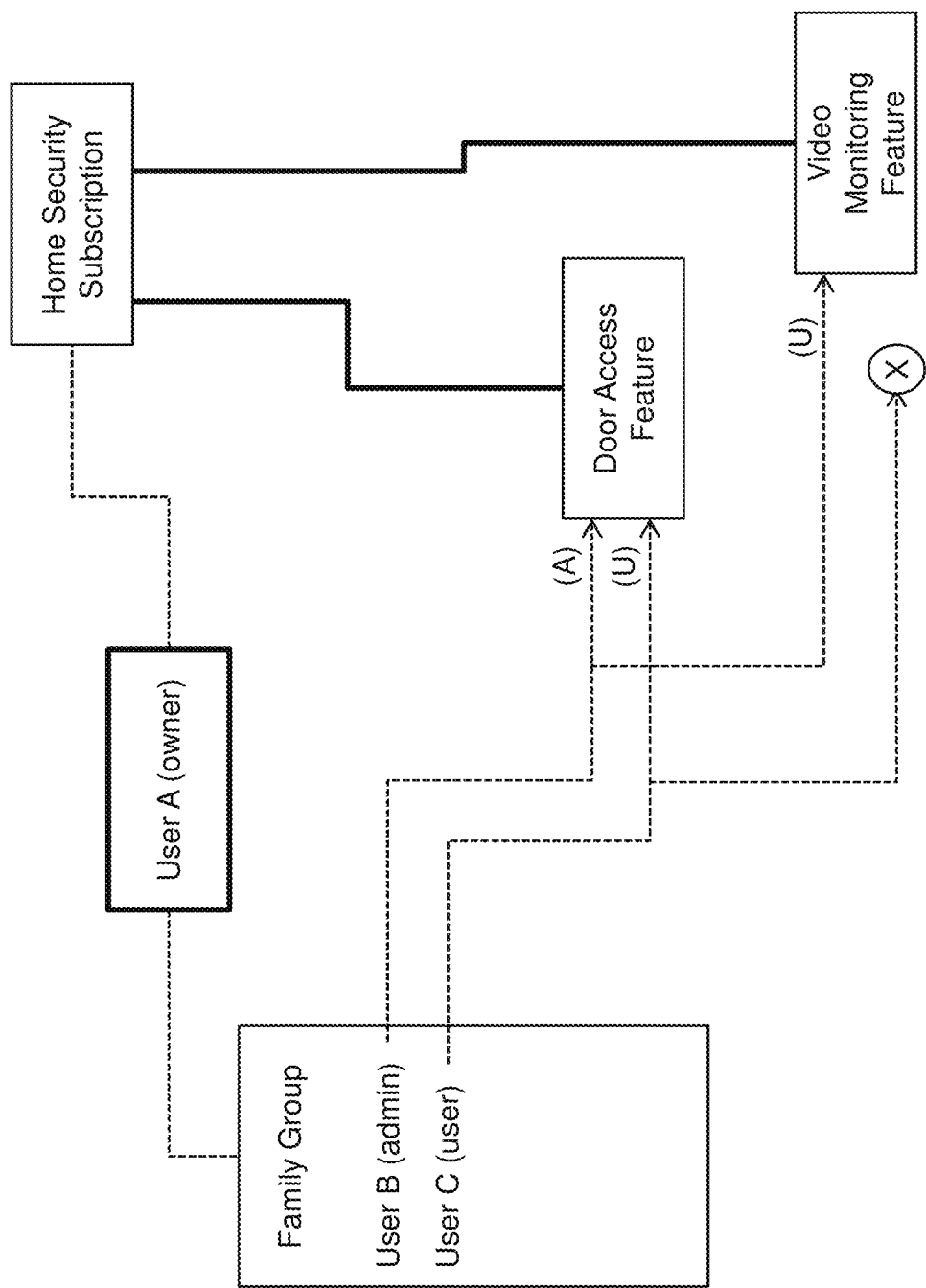
FIG. 7 is a flow diagram illustrating an example of feature level entitlement delegation.
Figure 8:
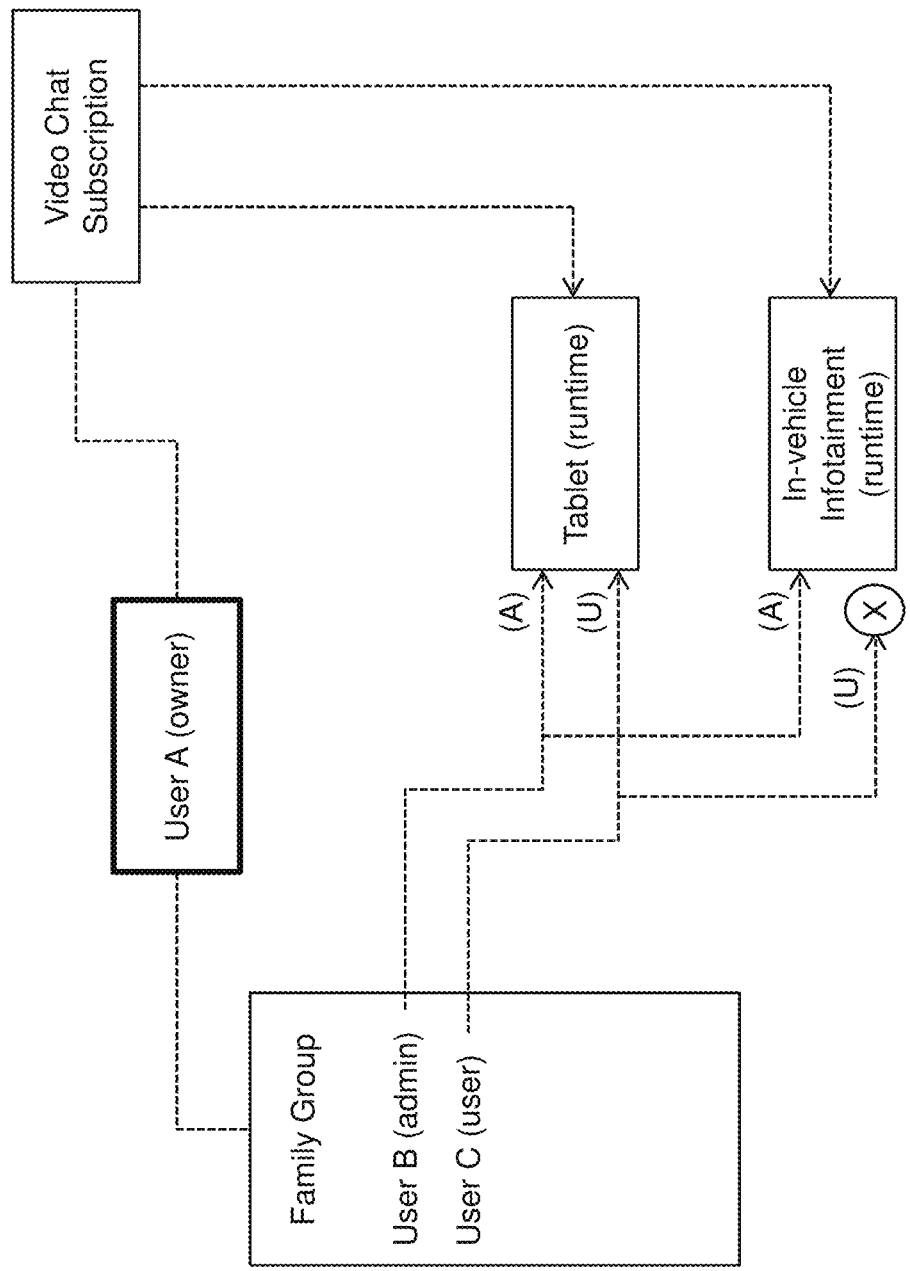
FIG. 8 is a flow diagram illustrating an example of device-runtime entitlement delegation.

FIGS. 6 to 8 provide simplified examples of how the associations 70 can be used to permit and/or restrict access to certain entitlements using the data model shown in FIG. 4. In FIG. 6, user-group relationships are illustrated. In this example, User A is the owner of an account with the entitlement delegation system 12, and has created a Family Group for that account. In this Family Group, a second user 122, namely User B is added, and User B also has access to the entitlement delegation system 12 via the app 22 running on a user device 18. However, User B in this example is also associated with a second group 124, namely Charity Group and is a regular user within that group 124. As such, by being integrated into the platform 10 via the Family Group, User B can be associated with other groups 124, managed by other individuals. That is, the associations 70 can extend across various users 122, groups 124, and devices 134 allowing a fully seamless experience for any user that is registered with the platform 10.

Similarly, in this example, User A has created a second group 124, namely Work Group for managing certain service entitlements for services 16 at work. In this example, a third user 122, namely User C is also associated with the Work Group. By establishing groups 124 and associating users 122 with those groups, the owner of an account 136 can delegate entitlements to their services 138 on a user-by-user basis, without having to share credentials with those users.

The example shown in FIG. 7 illustrates a feature-level entitlement delegation. In this example, User A adds Users B and C to the Family Group, with User B having an administrative designation. For a Home Security Subscription, User A is entitled to two features 142, namely a door access feature, which enables access entry at the family's home; and a video monitoring feature, which enables access to security camera footage of one or more viewpoints in and/or around the family home. When creating entitlements for Users B and C, it can be seen in this example that User A allows User B to have administrative (admin) privileges for the door access feature, meaning that User B can, for example, change a door passcode or key. User C on the other hand, is provided with regular user privileges, meaning, that User C can, for example, unlock the door using a near-field-enabled user device 18 but not be able to change the door passcode or key. For the video monitoring feature, User A allows User B to have normal or default user privileges, e.g., to be able to view certain cameras remotely, while restricting access to User C for this feature. In this way, User C is unable to view the security cameras. It can be appreciated that feature designations can be provided with as much or as little granularity as is possible when interfacing with the service 16. For example, the video monitoring feature could instead be split into a "viewing" feature 142 and a "recording" feature 142, wherein both Users B and C can view the camera feed, while User B can record the feed, but User C cannot.

FIG. 8 illustrates how device/runtime associations can be used to permit/restrict use of a service 16 using different user devices 18. Such control can be useful, for example, to restrict usage of cellular devices for certain services 16, to avoid large data charges, or to restrict use of certain distracting services 16 in vehicles in other circumstances where safety may be a concern. As shown in FIG. 8, a video chat subscription service 16 is shown, with a tablet runtime and an in-vehicle runtime. Using the associations 70, User A can permit both Users B and C to use the video chat subscription on a tablet (e.g., having only WiFi access), while restricting User C from using this subscription in an in-vehicle infotainment device setting. For example, if User C is a child of Users A and B, this restriction can be implemented for safety purposes such that User C is unable to engage in video chats while driving.

Figure 9:
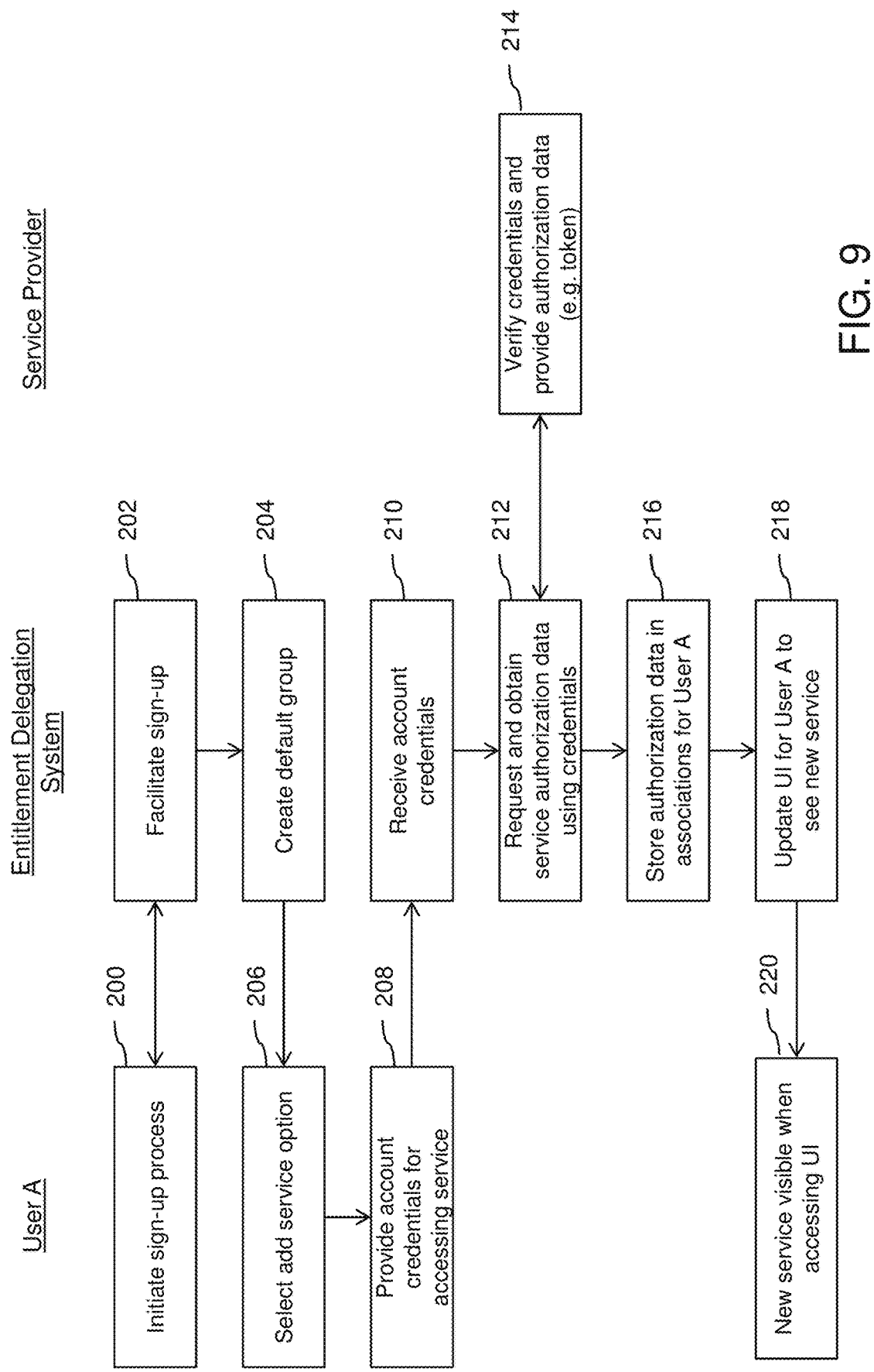
FIG. 9 is a flow chart illustrating computer executable instructions for registering a user and storing authorization data for that user.

FIG. 9 illustrates computer executable instructions that can be performed in registering a user and storing authorization data for that user in the platform 10. At step 200, in this example User A accesses and initiates a sign-up process with the entitlement delegation system 12, e.g., using the app 22 or a browser 102 on a suitable user device 18. The entitlement delegation system 12 facilitates the sign-up process at step 202, e.g., by running a server application that communicates with the app 22 or provides a sign-up UI via the browser 102. During the sign-up process, the system 12 can either ask for, or enforce, creation of a default or at least a first group 124 that is to be associated with a new user that is signing up. The entitlement delegation system 12 creates such a group at step 204 and enables User A to select an option at step 206, to add a new service to their account with the system 12.

As discussed above, the user would normally already have an existing account 136, and at least one service 138 provided in accordance with that account 136, and therefore would also normally have a set of credentials for accessing the service(s) 138, for example, a username and password. The user provides the appropriate credentials to the entitlement delegation system 12 at step 208 to enable the system 12 to access the service 138, and delegate access to that service 138, on behalf of the user. The system 12 receives the credentials at 210 and requests "service authorization data" such as a token 152 at step 212. This is done by the service provider verifying the credentials provided by the system 12 and generating suitable authorization data, such as the token 152, at step 214. This authorization data is stored by the system 12 at step 216 in association with User A, such that any other entitlement associations can have suitable access to the authorization data, as permitted by User A. The system 12 may then update the UI for the app 22 or browser 102 at step 218, to allow User A to view and connect to the newly added service through the app 22 or browser 102 at step 220.

Figure 10:
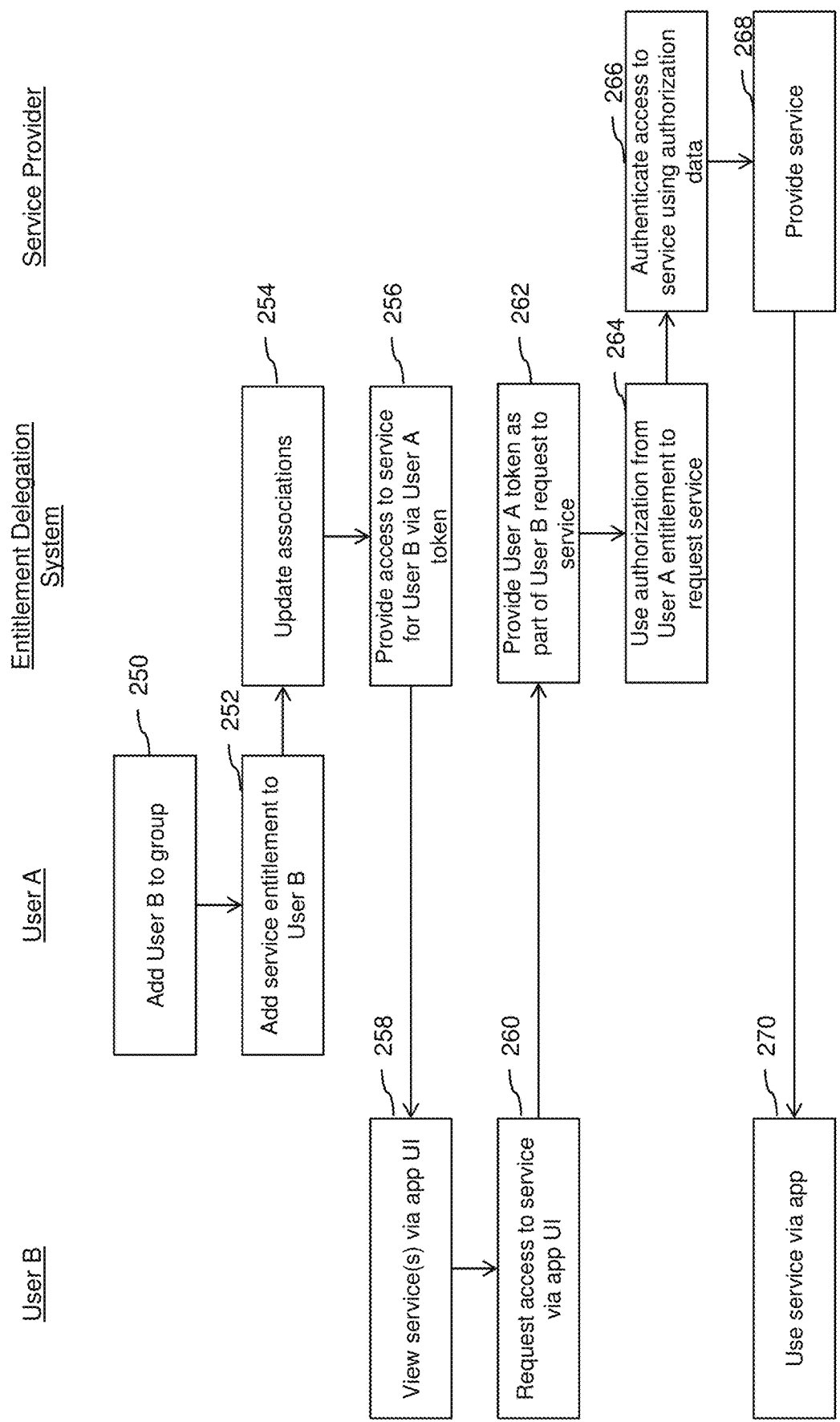
FIG. 10 is a flow chart illustrating computer executable instructions for adding another user to a group and delegating access to a service to that user.

FIG. 10 illustrates computer executable instructions that can be performed in adding another user 122 to a group 124 and delegating access to a service 16 to that user 122. At step 250, User A selects an option to add User B to the group. It is assumed that User B is registered with the entitlement delegation system 12, e.g., by having created a user account and/or profile. After adding User B to the group 124 an association is made between the group 124 created by User A, and the entity now representing User B. User A may then delegate a service entitlement for User B at step 252, e.g., to access the service added in FIG. 10. The service entitlement can include various attributes, such as a user role 126, restrictions on runtime 134, feature-level permissions, etc. Based on these attributes, the entitlement delegation system 12 updates the corresponding associations 70 at step 254. The system 12 also authorizes access to the service in the app UI for User B at step 256, using User A's authorization token. It should be noted that although the entitlement delegation system has the knowledge that User B is accessing the service, the service itself believes it is authorizing User A to the service.

User B is now able to view the newly added service 16 via the app UI, at step 258, e.g., via the app 22 or a browser 102. In this example, User B requests access to that service at step 260, via the app UI, e.g., by selecting an icon, option, or other input mechanism. After making this request, the entitlement delegation system 12 authorizes the request at step 262, by checking the associations and obtaining the appropriate authorization data for User A's account 136. The authorization data may then be used at step 264 to request access to the service 16 at the service itself at step 264. The service provider would use the authorization data to authorize the request at step 266, and provide the service at step 268 to User B, via the entitlement delegation system 12 or a redirection coordinated thereby. This enables User B to use the service via the app 22 at step 270. User B is now able to query the APIs of the service using the authorization granted by the service provider to User A. While the service itself remains blind to User B, the entitlement delegation system captures the distinction between User A and User B consuming the service.

Figure 11:
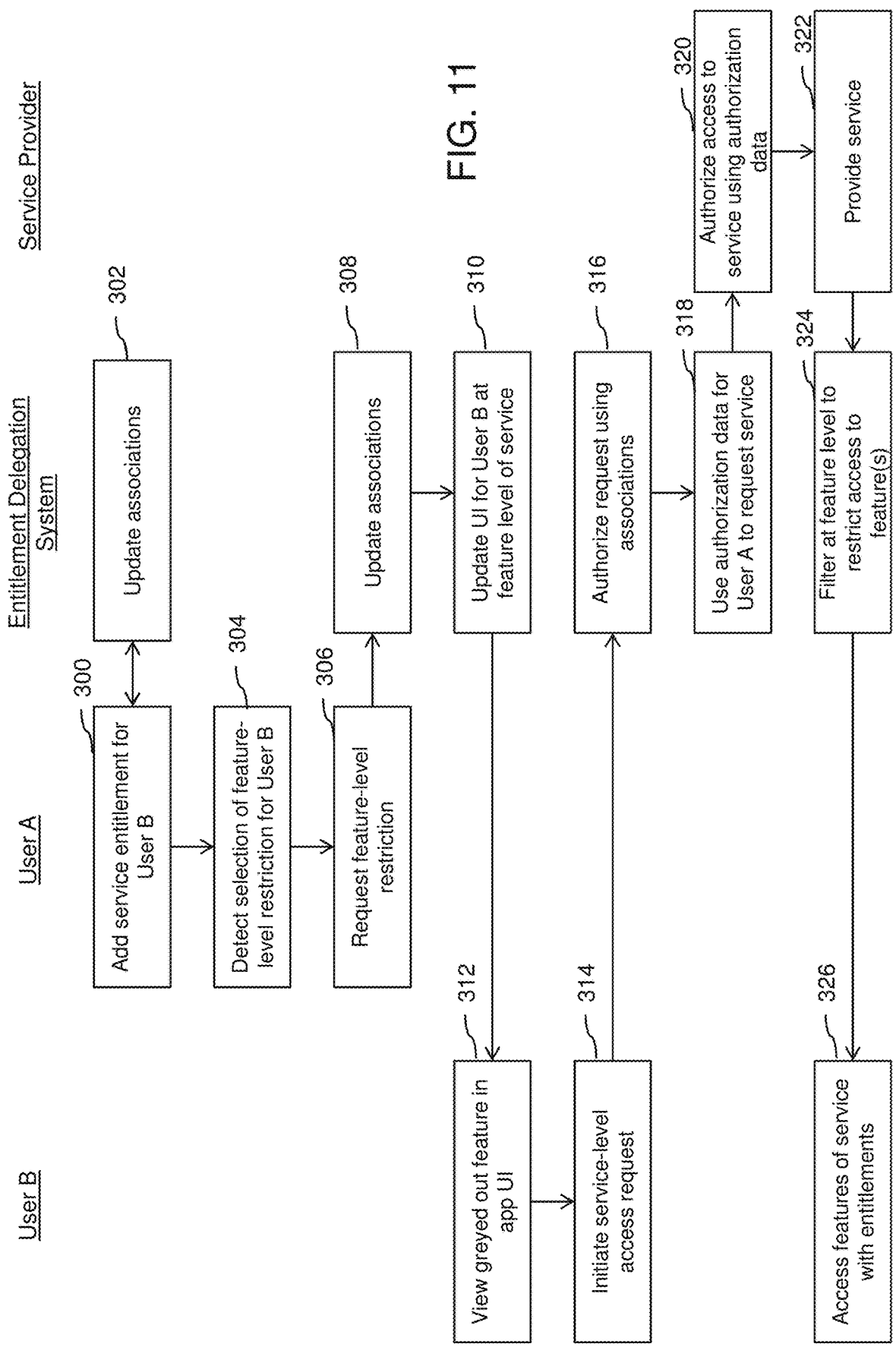
FIG. 11 is a flow chart illustrating computer executable instructions for delegating feature-level entitlements to another user.

FIG. 11 illustrates computer executable instructions that can be performed in delegating feature-level entitlements to another user 122 in a first example. In this example, User A selects an option at step 300, e.g., in the app UI, to add a service entitlement for User B. The entitlement delegation system 12 updates the associations 70 at step 302 to enable User B to have the selected entitlement on behalf of User A. While User A is adding a service entitlement for User B, in this example, User A also selects an option at step 304, to add a feature-level restriction for that service entitlement. Based on the detected selection, User A sends a request for that feature-level restriction to the entitlement delegation system 12 at step 306. The system 12 further updates the associations 70 at step 308, in order to ensure that while User B has access to the particular service 16, certain one or more features 142 are not available or are restricted, in at least some form, to User B.

The entitlement delegation system 12 then updates the UI for User B at the feature level of the service 16 at step 310. For example, in the app UI for User B, a listing of available features for the service 16 which has been delegated can show a greyed out icon or option corresponding to the restricted feature 142 as illustrated by step 312 in FIG. 12. When User B initiates a service-level access request at step 314, e.g., by launching or otherwise selecting an option corresponding to that service 16, the entitlement delegation system 12 authenticates the request using the associations 70 at step 316. At this step, the system 12 can determine that User B does have a service-level permission, but has at least one feature-level restriction. Accordingly, the system 12 uses the authorization data for User A to request access to the service 16 at step 318, which is authorized by the service provider at step 320. The service 16 and all of its features (or at least a sub-set that includes the restricted feature) are provided at step 322. In this example, the entitlement delegation system 12 filters the service features to restrict access to the feature(s) at step 324 based on the associations 70, and this allows User B to access the features for which he/she has entitlements at step 326. In this way, the entitlement delegation system 12 requests and obtains access to the service 16 as if there was full access, and uses its internal data model and associations established therein, to implement feature-level access control. Filtering features in this way can be performed when the service provider does not provide feature-specific APIs, but rather service-level APIs.

Figure 12:
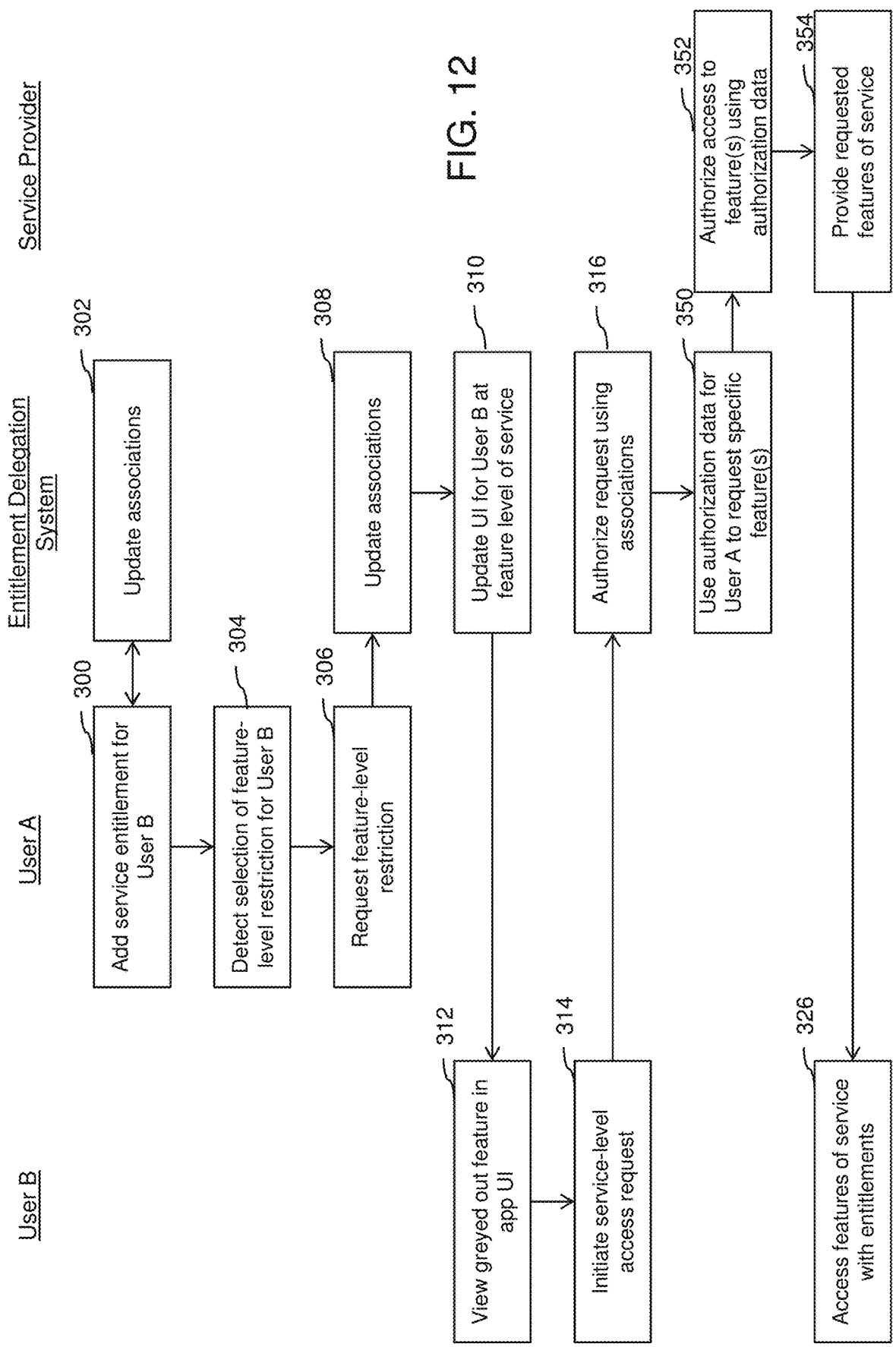
FIG. 12 is a flow chart illustrating computer executable instructions for delegating feature-level entitlements to another user.

FIG. 12 illustrates computer executable instructions that can be performed in delegating feature-level entitlements to another user in a second example. In this second example, it is assumed that the service provider provides feature-specific APIs, for at least the feature(s) restricted by User A in the example shown in FIG. 11. It can be appreciated that in FIG. 12, steps 300 to 316 correspond to the same example as that shown in FIG. 11 and need not be reiterated. In this second example, however, at step 350, the entitlement delegation system 12 uses the authorization data for User A and the associations to make a feature-specific access request. For example, the service provider may have exposed feature-level APIs for the various features in a service 16 and this allows the authorization data to target only those features that have been delegated by User A. The request is authorized by the service provider at step 352, using User A's authorization data (e.g.: token) and the requested feature(s) of the service are provided to User B at step 354, either directly via the app 22 or a browser 102, or via the system 12.

The entitlement delegation system 12 used via the app 22 used on the user's devices 18 enables users to sign-up, create groups, add users to such groups, add services, and change or add associations 70, from any device 18, anywhere, and at any time, enabling multi-service and feature-level entitlement delegation in a scalable and real-time manner, without requiring credential sharing among users, and without requiring significant (if any) programming to the existing operation IT and/or service infrastructure. Moreover, the entitlement delegation system 12 provides a unified platform 10 from which many services can be controlled, providing a central tool for households and other organizations or groups to manage access to services.

Turning now to FIGS. 13 through 23, various screen shots and user-interaction workflows are illustrated. In FIGS. 13(*a*) through 13(*d*), a series of screen shots are shown for an exemplary app UI. In FIG. 13(a), a services UI 400 is shown, listing Services 1-4 that are available to User B. Meanwhile, as shown in FIG. 13(b), an administrative UI 410 is shown on User A's device 18. In this example, User A selects a service restriction option 414 aligned with Service 2, to remove the entitlement for User B. After making this change, as shown in FIG. 13(c), Service 2 is greyed out in the services UI 400. Since both User A and User B are connected through the entitlement delegation system 12 via the app 22, updates such as that shown in FIGS. 13(a) to (c) can be experienced in real-time or near-real-time, such that the greying out of Service 2 could be seen by User B as or immediately after the restriction occurs. Similarly, as illustrated in 13(d), the bi-directional messaging module 54 enables real-time notifications (e.g., text messages, email alerts, etc.) to be sent to User B such that a notification message 424 can be viewed in an application UI 422 at User B's device 18. It can be appreciated that either or both of the outcomes shown in FIGS. 13(c) and (d) can be implemented. Moreover, other notification modalities can be used and those shown herein are for illustrative purposes.

FIGS. 14(a) to 14(d) illustrate creation of an account and a new group with the entitlement delegation system 12. As shown in FIG. 14(a), a sign-up UI 500 is shown in which a new user's details can be added using a series of entry boxes 502. By selecting a Create an Account option 504, a new account is created with the delegation entitlement system 12 and a welcome UI 510 is shown as illustrated in FIG. 14(b). The welcome UI 510 in this example requests that the new user first create a group (e.g., for a household as a default) by entering a group name in an entry box 512. The welcome UI 510 can also illustrate other users that are currently in the group and can enable more to be added in the same screen. For other users to be added, they are typically invited and then sign-up thereafter, however, user that already have accounts with the entitlement delegation system 12 can also be added.

By selecting a Next option 514 as shown in FIG. 14(b), an account creation UI 520 can be displayed as shown in FIG. 14(c). This UI 520 can be used to confirm creation of the new account and provides a Dashboard option 522 to enable the user to discover their dashboard (to be described later), providing options and access to services 16 that are associated with the user's account. The account creation UI 520 shown in FIG. 14(c) is provided with the app 22 (or browser 102) being used to sign-up. The entitlement delegation system 12 can also send a welcome notification message 532 to the newly registered user such that the message 532 is viewed in that user's inbox UI 530 as shown in FIG. 14(d). In this example, the message 532 includes a confirmation option 534 to enable the newly registered user to confirm their email address by selecting same.

Figure 15B:
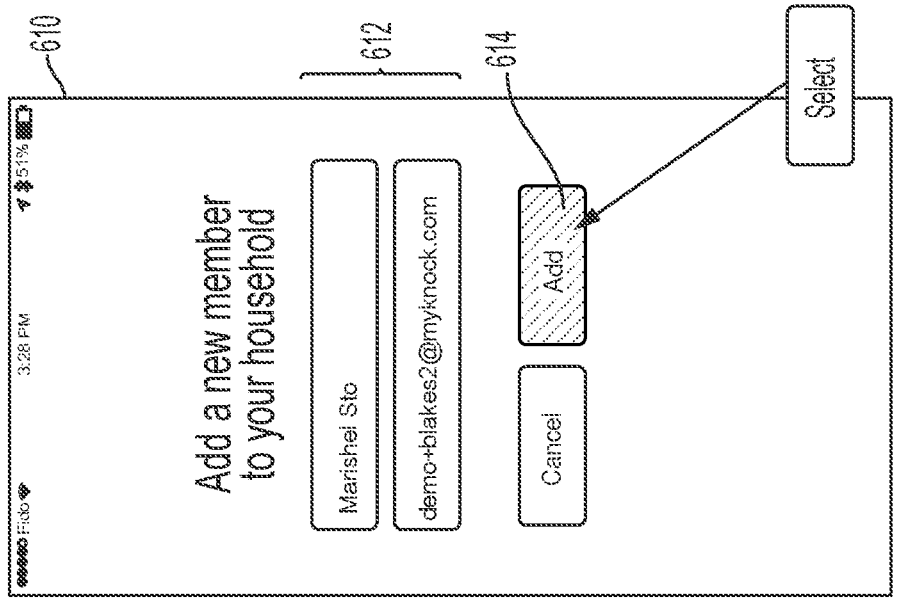
FIG. 15(b) is a screen shot of an example of a user interface for entering details for a new user being added to a group.
Figure 15A:
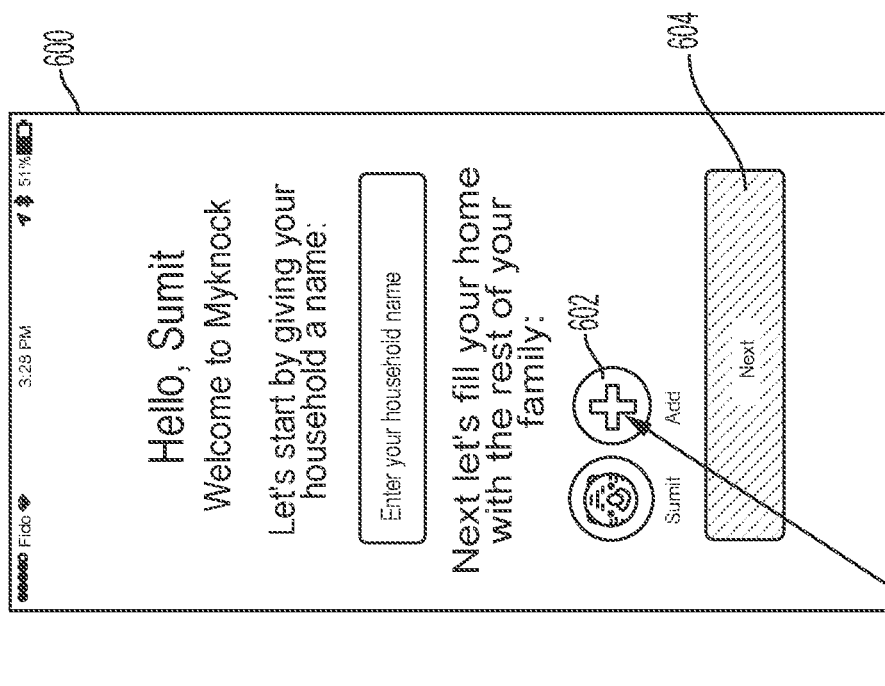
FIG. 15(a) is a screen shot of an example of a user interface for adding a new user to a group.

FIGS. 15(a) to 15(d) illustrate adding a user to a group. In FIG. 15(a), a welcome UI 600 is shown in which the user selects an Add option 602 prior to selecting the Next option 604. Selecting the Add option 602 displays an add new member UI 610 as shown in FIG. 15(b). In this UI 610 the new member's details can be added using a number of entry boxes 612 and by selecting an Add option 614, the user's display can return to the welcome UI 620 as shown in FIG. 15(c) in which the new member "Marishel" has been added. By selecting the next option 622, the user can continue to, for example, a dashboard as exemplified above. FIG. 15(d) illustrates a welcome message 632 received in an inbox UI 630, displayed by a user device 18 for the new member, which enables that new member to then be integrated in the entitlement delegation system 12. It can be appreciated that the welcome message 632 can vary depending on whether the new member is a new or existing user to the entitlement delegation system 12. For example, as discussed above, users can belong to multiple groups and associations 70 can cross over throughout the platform 10. As such, the new member that is added may be new to the system 12 or an existing user that is simply notified of the new association 70 that has been created.

Figure 16B:
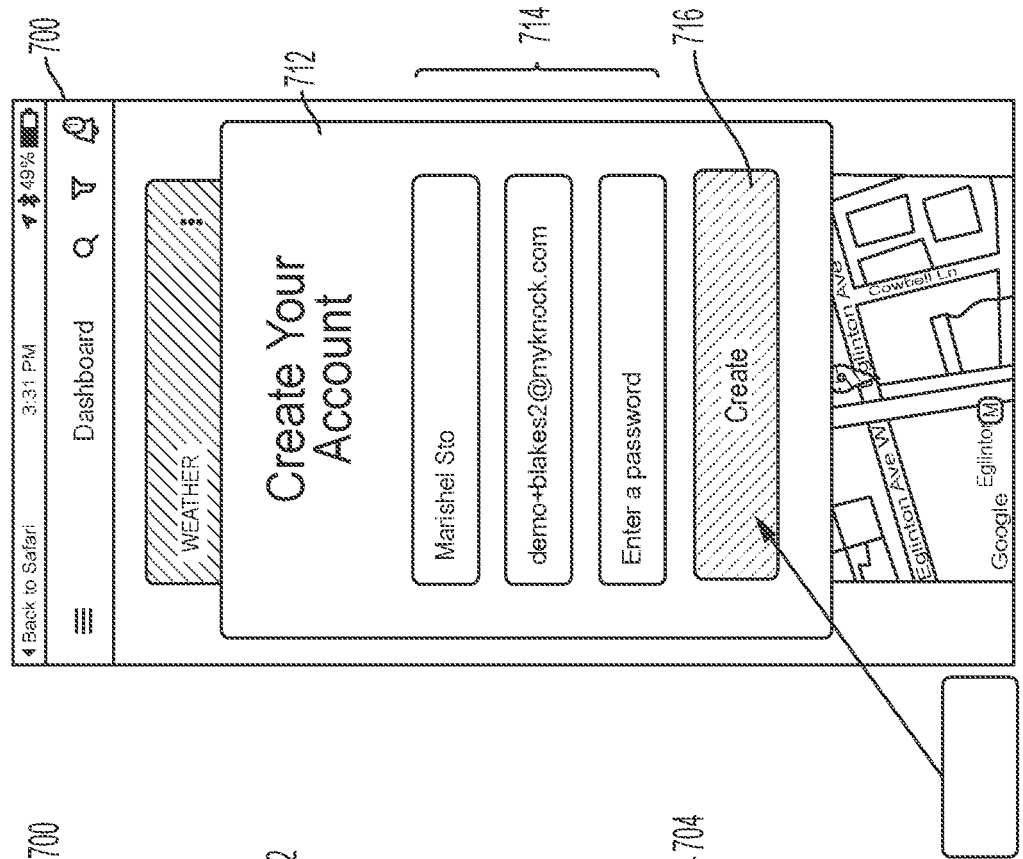
FIG. 16(b) is a screen shot of an example of a user interface for creating a new account upon accepting an invitation to a new group.
Figure 16A:
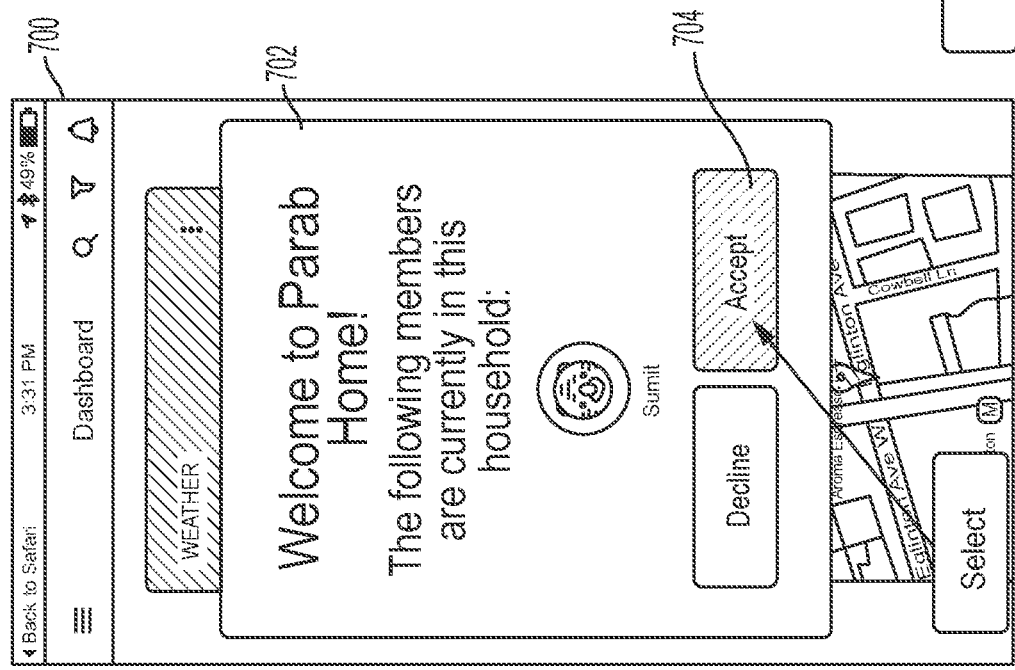
FIG. 16(a) is a screen shot of an example of a user interface for accepting an invitation to a group.

FIGS. 16(a) and 16(b) illustrate UIs that are viewed by the new member, e.g., after initiating a registration (or email confirmation) process by selecting a link in the welcome message 632 shown in FIG. 15(d). In FIG. 16(a), the new member accesses a dashboard UI 700 which includes a membership update 702 indicating that the user has been added to the group and shows other members of the groups. In this example, it is assumed that the new member is also a new user of the entitlement delegation system 12 and by selecting an Accept option 704, an account creation dialog 712 is displayed with a number of account detail entry boxes 714 and a Create option 716 as shown in FIG. 16(b). By selecting the Create option 716 the new member becomes a registered user of the entitlement delegation system 12 and inherits the various associations 70 that have been established for the group(s) to which it has been added.

Figure 17C:
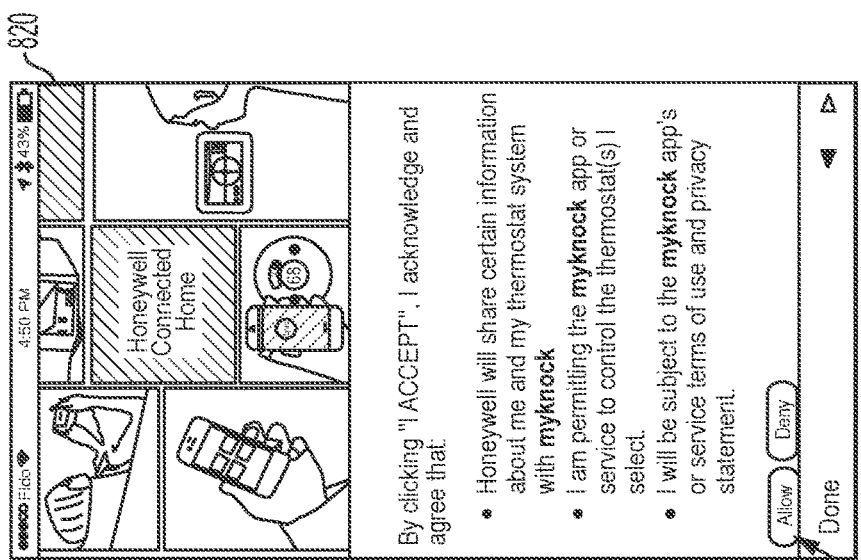
FIG. 17(c) is a screen shot of an example of a user interface for accepting conditions of a service being added to an account.
Figure 17B:
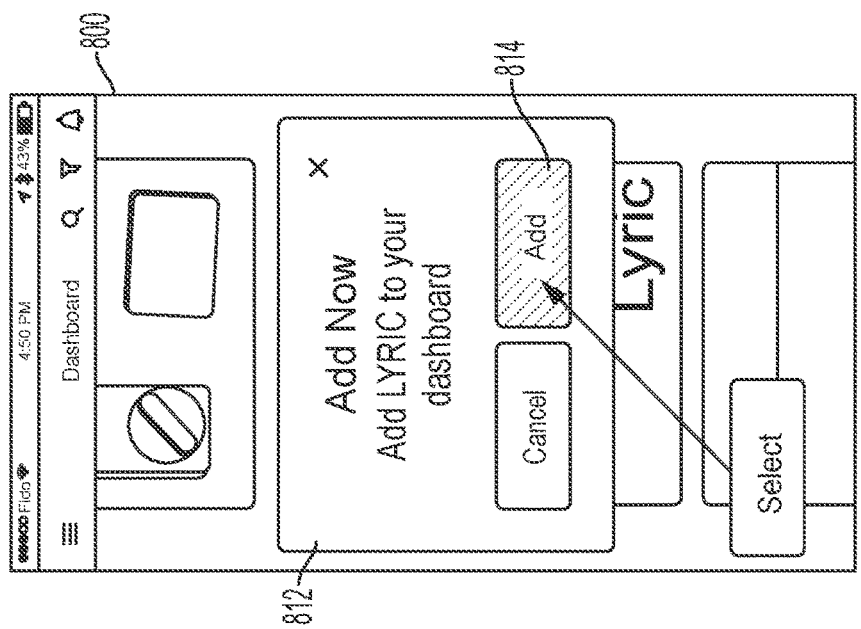
FIG. 17(b) is a screen shot of an example of a user interface for adding a new service to an account.
Figure 17A:
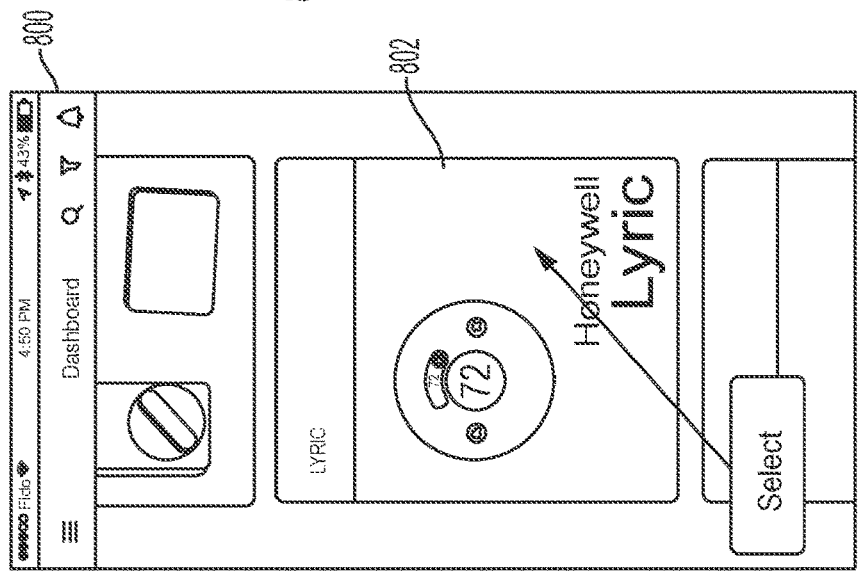
FIG. 17(a) is a screen shot of an example of a user interface for a dashboard displaying services that are or can be added to a user's account.

FIGS. 17(a) to 17(e) illustrate a workflow that can be used in adding a new service 16. FIG. 17(a) illustrates a dashboard UI 800 for a user, in which one or more available services (i.e. those that are established with the multi-service gateway 14) are "greyed out" to provide a visual indication that the service 16 can be added. In this case a Lyric service icon 802 is being viewed. By selecting the icon 802 as shown in FIG. 17(a) (or by selecting another option), an add service dialog 812 is displayed as shown in FIG. 17(b). The user can select an Add option 814 to have that service 16 added to their account. FIG. 17(c) illustrates an example of a registration UI 820 for that service 16, which can provide user terms and conditions, can request user credentials to obtain, for example, authorization data such as a token 152. As such, it can be appreciated that the UI 820 shown in FIG. 17(c) is only illustrative of one or more screens/UIs that would be presented to the user in order to obtain the necessary permissions and credentials to integrate the selected service 16 with the user, within the platform 10. By adding multiple services 16 in this way, the dashboard 800 provides a single portal into various services 16 that can not only be accessed, but for which entitlements can be delegated within a household or other organization.

Figures 17D, 17E:
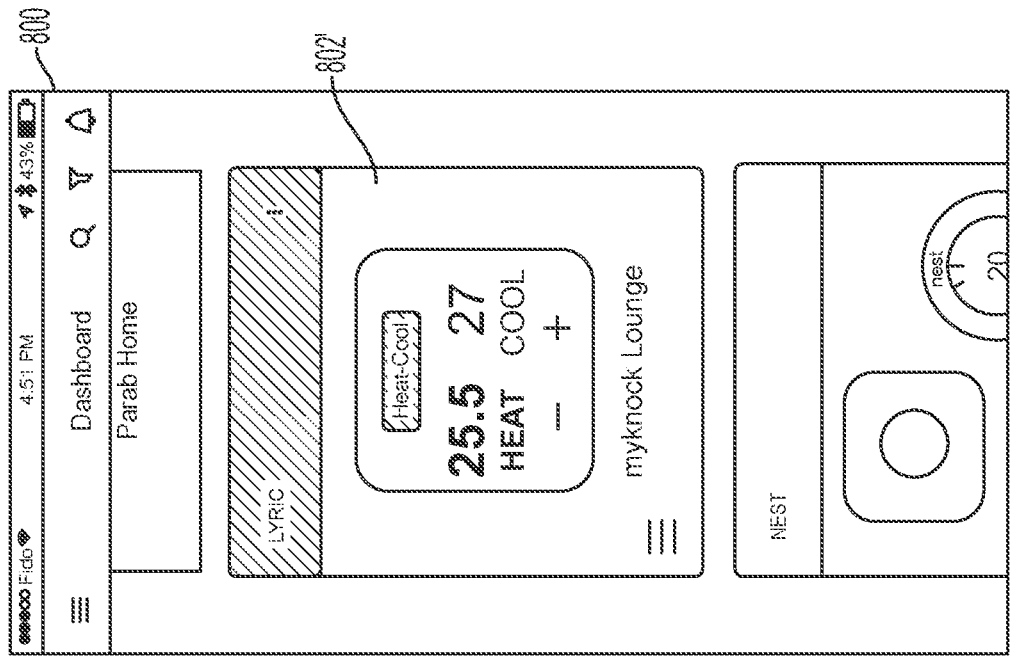
FIG. 17(d) is a screen shot of an example of a user interface for confirming the addition of a new service and enabling options to be selected for the group.
FIG. 17(e) is a screen shot of an example of a user interface for the user's dashboard showing the newly added service as being accessible.

FIG. 17(d) illustrates a service confirmation dialog 840 displayed after successfully adding the service 16. The dialog can include various options or settings, for example, a share toggle 842 for sharing that service 16 with the Household group (and/or any other groups that may be listed in the dialog 840). By selecting a Done option 844, the service 16 becomes visible in the dashboard UI 800 as shown in FIG. 17(e) by displaying an active icon 802' for that service (e.g., by changing the greyed out icon 802 to a color version 802').

Figure 18:
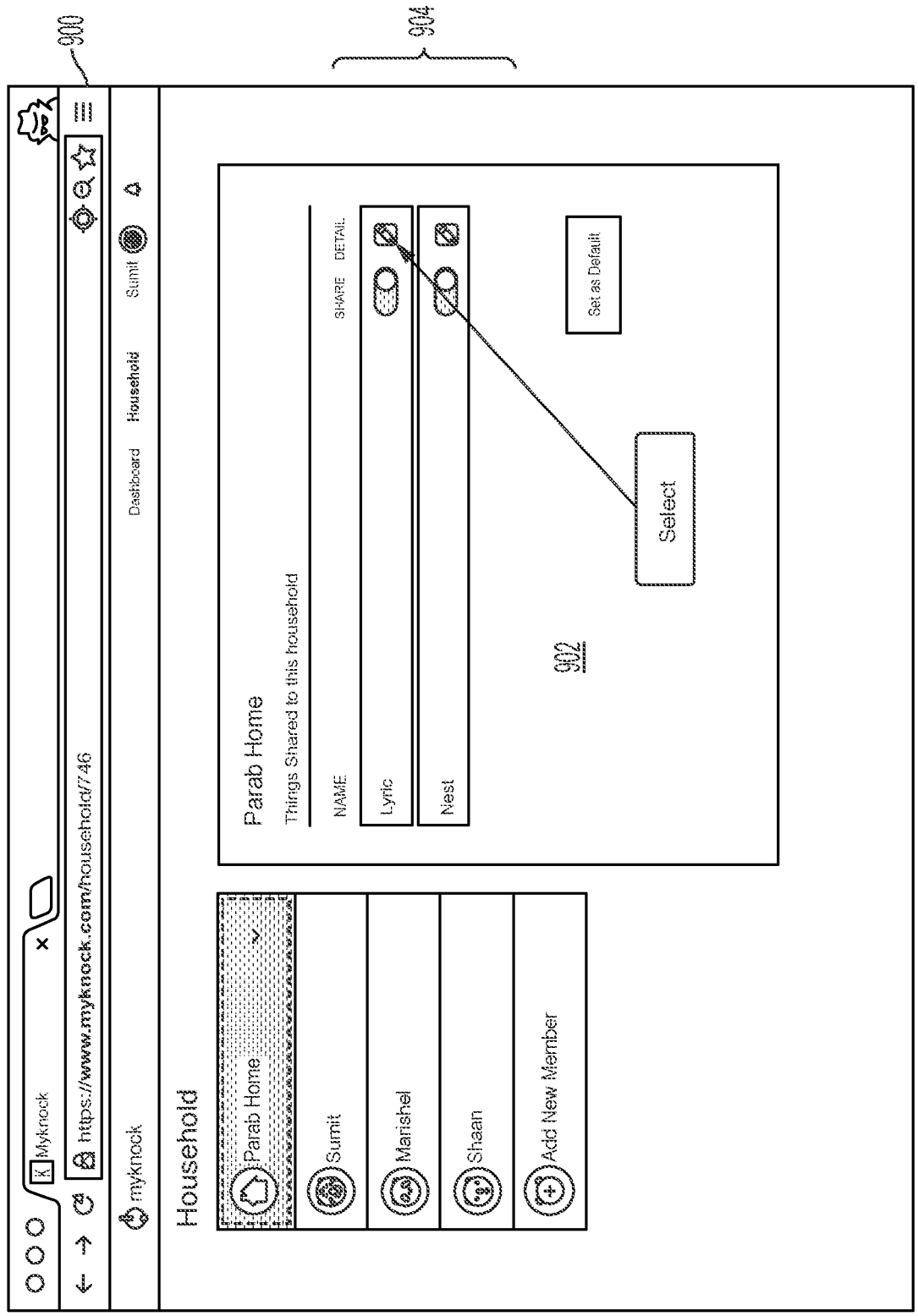
FIG. 18 is a screen shot of an example of a user interface for viewing household details and options.
Figure 19:
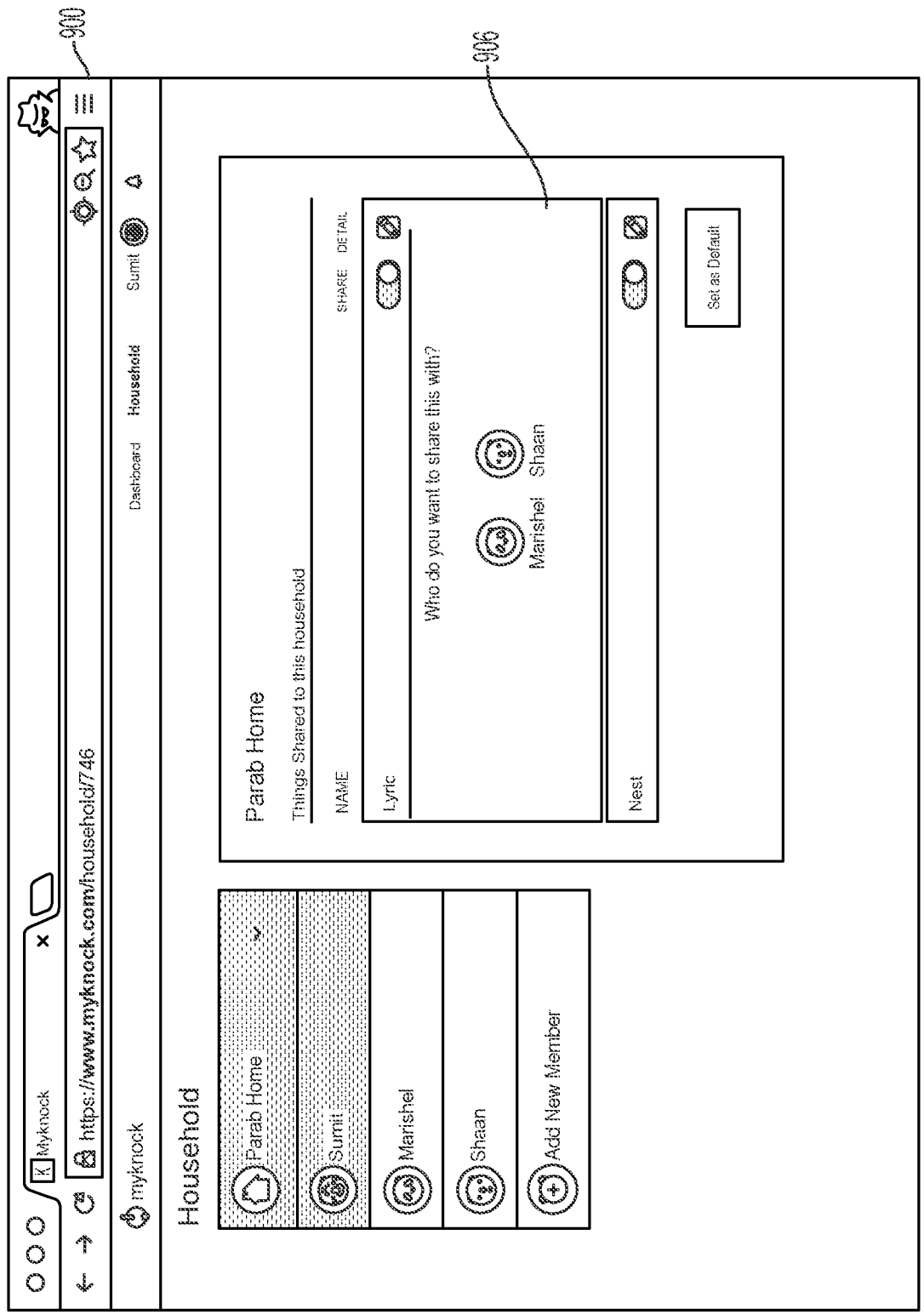
FIG. 19 is a screen shot of an example of a user interface for viewing options and settings for a particular service that has been added to a group.

FIGS. 18 and 19 illustrate service delegation operations. In FIG. 18, a household UI 900 is shown for the group Parab Home. A list 904 of services 16 is shown in a shared view 902 within the UI 900. The list 904 enables the user to view all of the services 16 that have been associated with their account, as well as which ones have been delegated within that particular group. Share toggles or other mechanisms can be presented in this view 902, in order to allow the user to conveniently change or add entitlements to those services 16. By selecting a details option, further details regarding to whom entitlements have been delegated as shown in FIG. 19. In this example, two sub-users are shown under the Lyric service and by selecting or de-selecting the avatars for those users, the service can be individually delegated within the group, rather than only at the group level. It can be appreciated that where a service has feature-level entitlement options, the features can be listed for that service 16, and under each feature, similar avatar selection options for delegating at a feature-level.

Figure 20A:
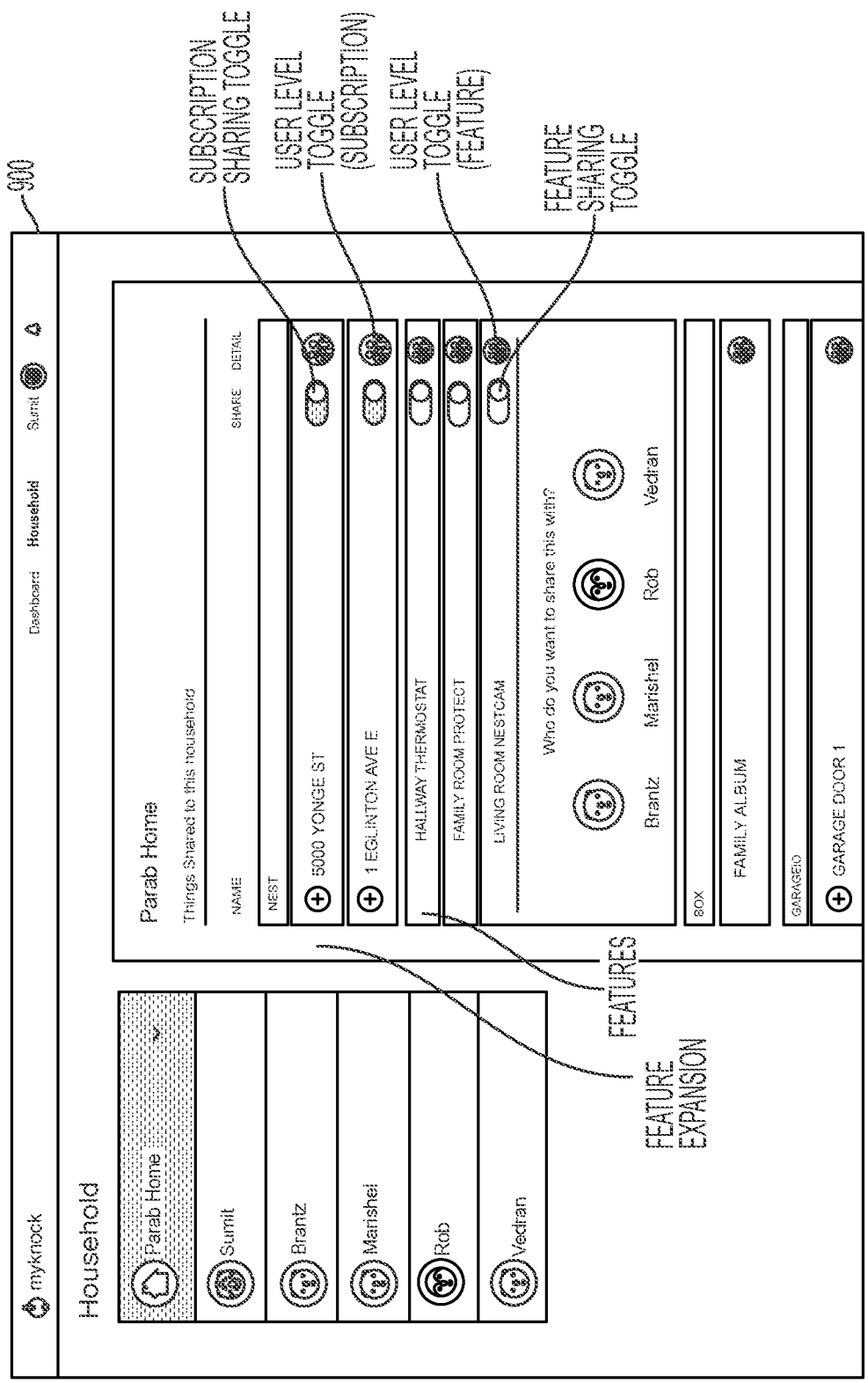
FIGS. 20(a) to 20(e) are a series of screen shots illustrating feature-level selection options.

FIG. 20(a) shows a feature-level selection UI displayed within the household UI 900. As described below making reference to FIGS. 20(b) through 20(e), various UI elements are provided to allow feature-level delegation, namely subscription sharing toggles, user level toggles (for subscriptions), user level toggles (for features), feature sharing toggles, feature expansion, and the features themselves.

Figure 20B:
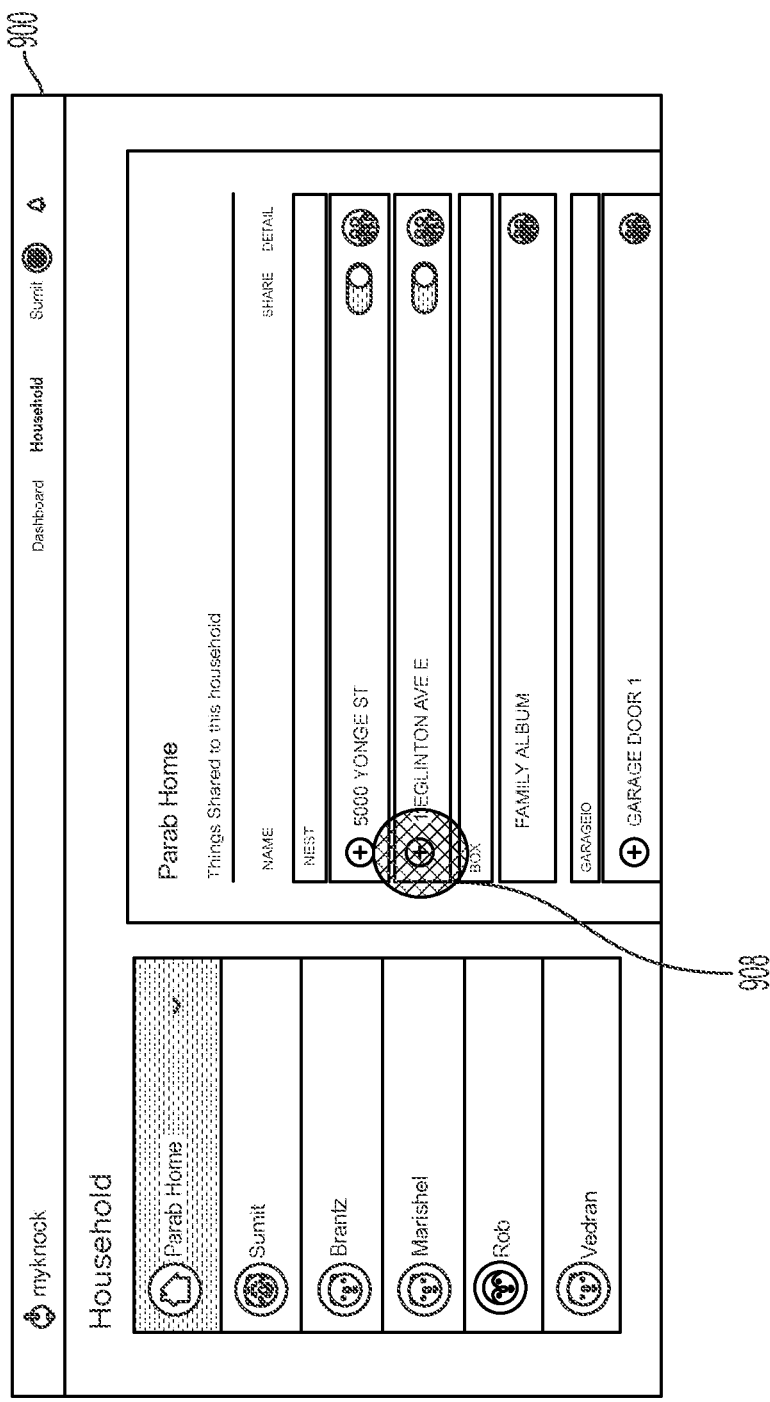
Figure 20C:
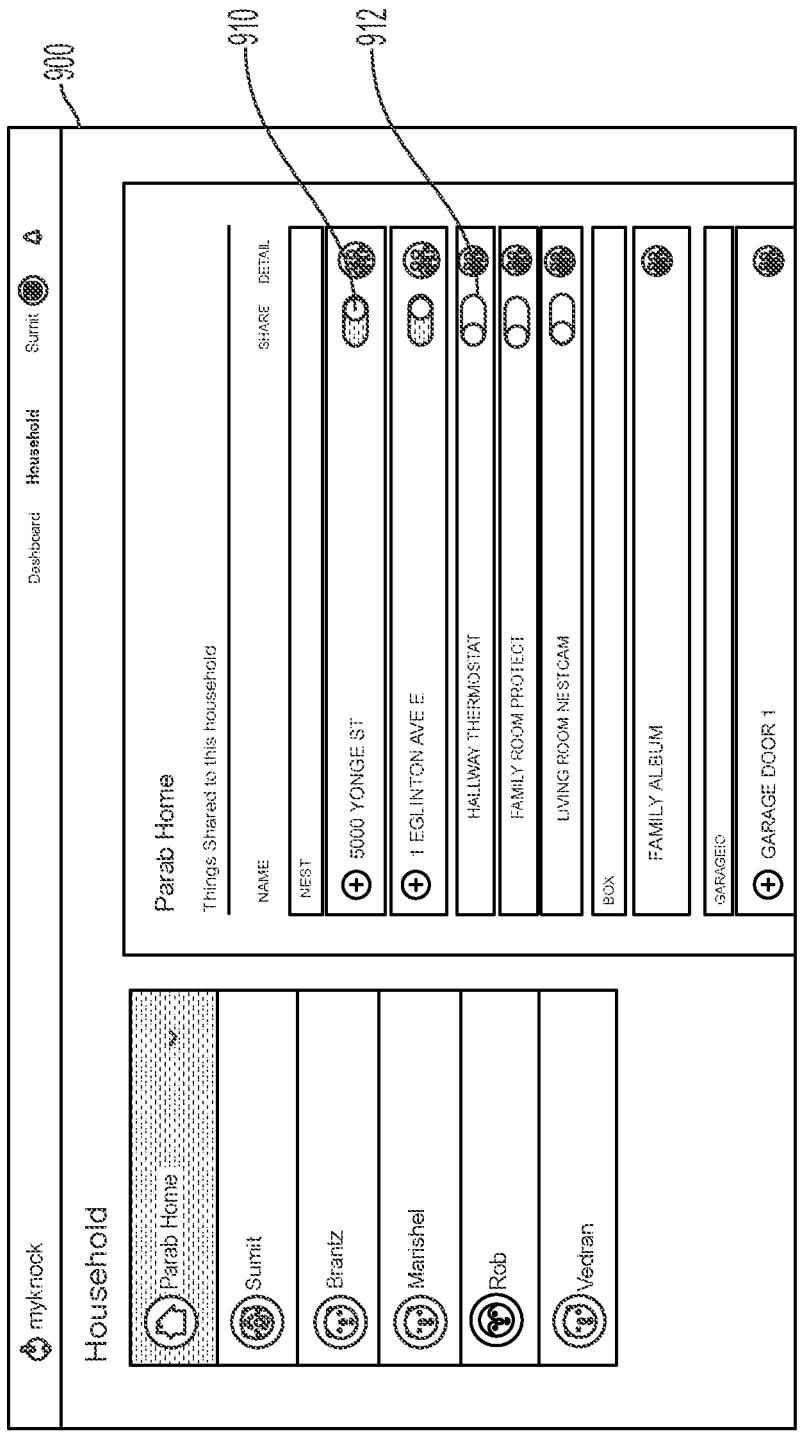

Turning first to FIG. 20(b), feature level expansion controls 908 appears when there is more than one feature tied to a particular subscription. Pressing the control expands and displays the other features associated with that subscription. As shown in FIG. 20(c), a subscription share toggle 910 is responsible for sharing on a subscription level. These toggles 910 have three states, namely: OFF—where the subscription and all associated features are not shared; ON—where the subscription and all features are shared; and PARTIAL—where some features in the subscription are shared while others are not. A feature share toggle 912 is responsible for sharing at a feature level and has two states, namely: OFF—where the feature is not shared; and ON—where the feature is shared.

Figure 20D:
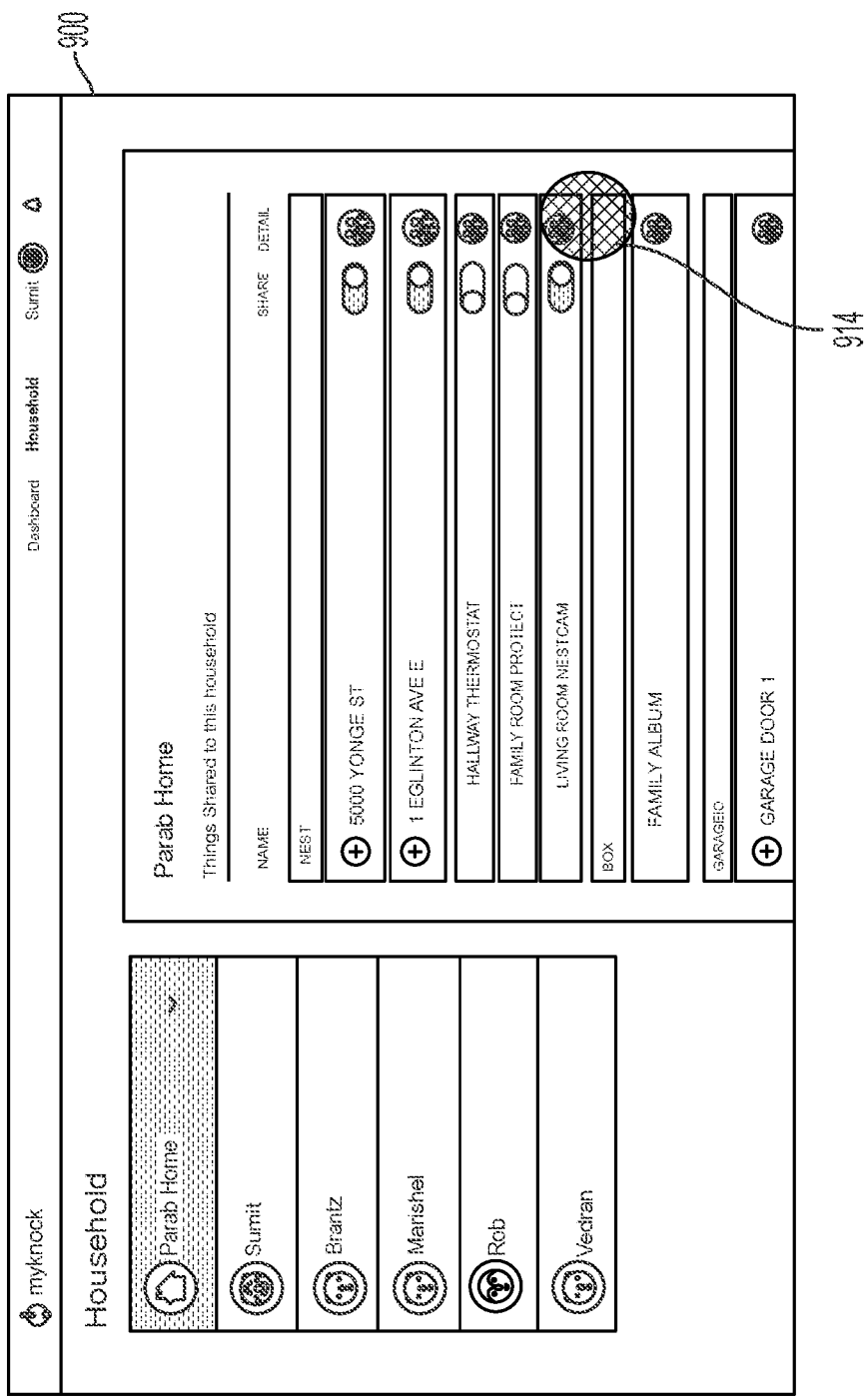
Figure 20E:
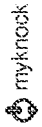

User level expansion controls 914 can also be provided as shown in FIG. 20(d). The user-specific sharing control appears on both the subscription and features for a given service. Pressing the control will expand the specific subscription (or feature) and allow for the service owner select users for a specific share. The user share control in this example is only active if the feature or subscription is fully shared to the user. In this example, the control will not be active on partial subscription shares—for that the feature level control should be used. For user sharing visual states 916, as shown in FIG. 20(e), the user sharing control also conveys the state of the share. The toggle has three states, namely: OFF—where the subscription is not shared with any users, and which should only occur when the feature or subscription level toggle is off; ON—where all users of the group have the service shared to them; and PARTIAL—where some users have the service removed from them. The partial state can also be present when the feature toggle is in the ON state and all users are deselected, since new users will have the feature shared to them upon joining.

Figure 21:
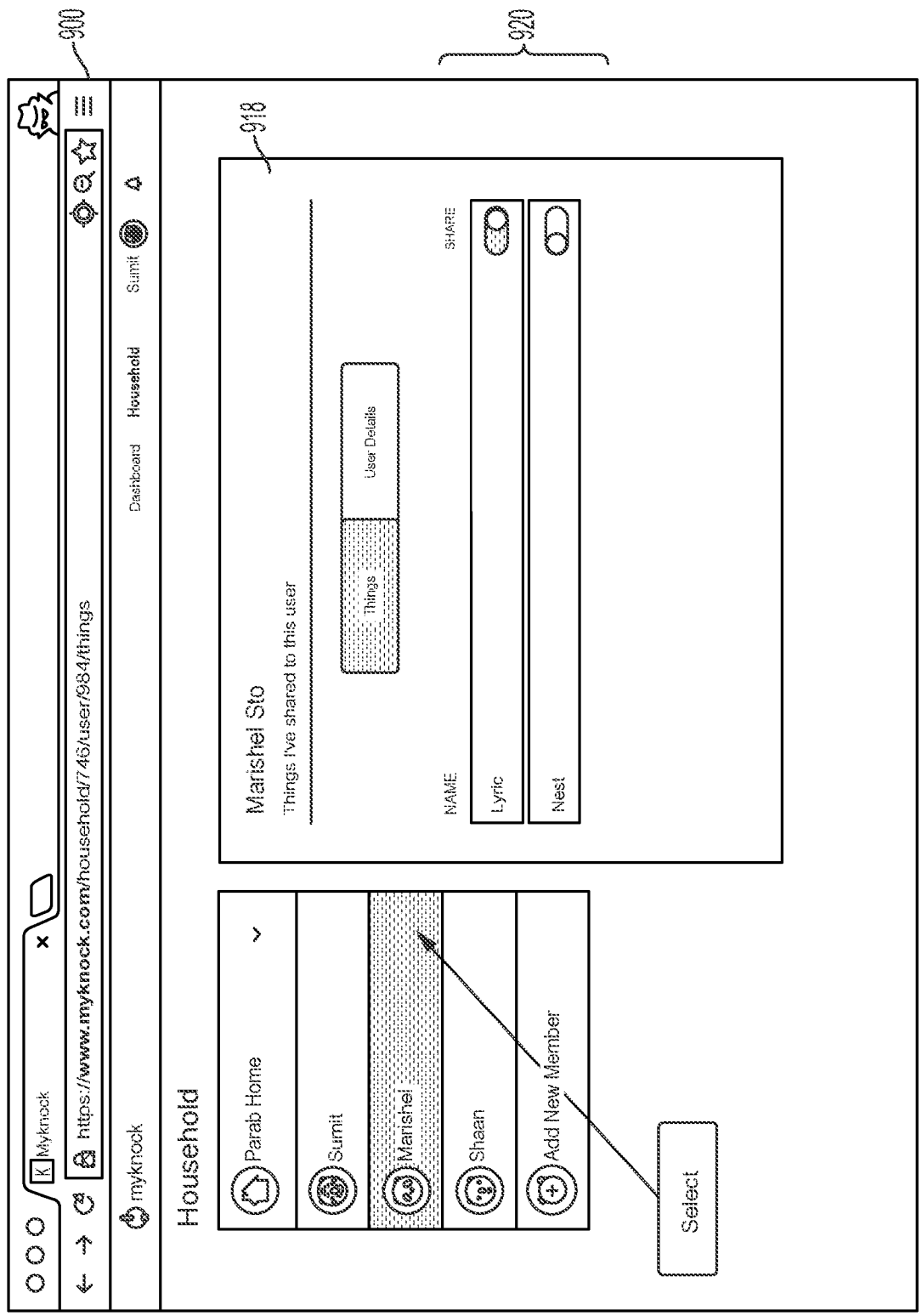
FIG. 21 is a screen shot of an example of a user interface for viewing options and settings for a particular user that has been added to a group.

FIG. 21 illustrates service management options. In this example, by selecting the sub user Marishel, a sub-user view 918 is displayed, which provides a list 920 of the services that would be available to be associated with that sub-user and whether or not they have been shared. In the example shown in FIG. 21, a Things tab is shown, and a User Details tab can also be displayed to allow the user to view those details.

Figure 22:
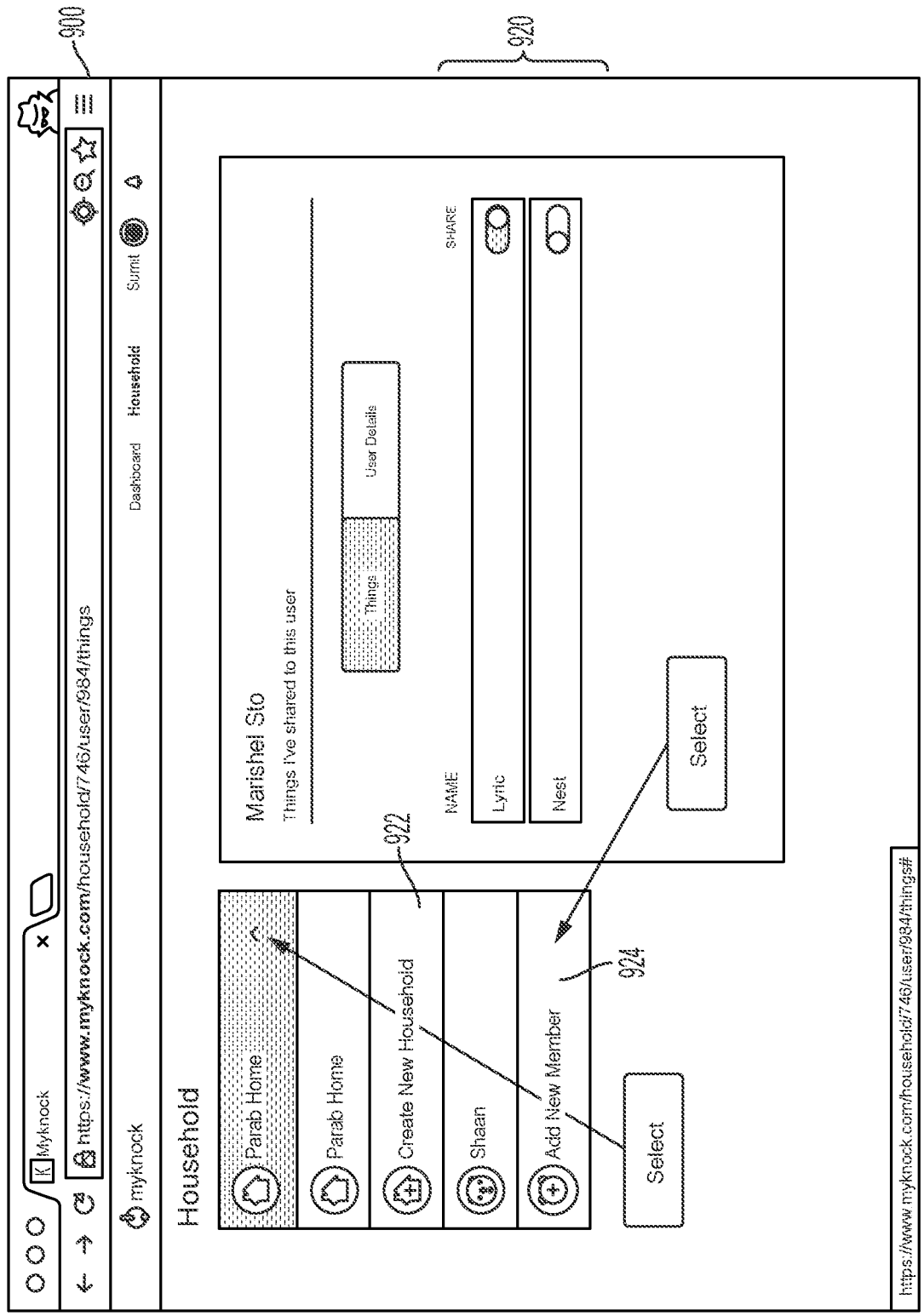
FIG. 22 is a screen shot of an example of a user interface for viewing options for creating a new group.
Figure 23:
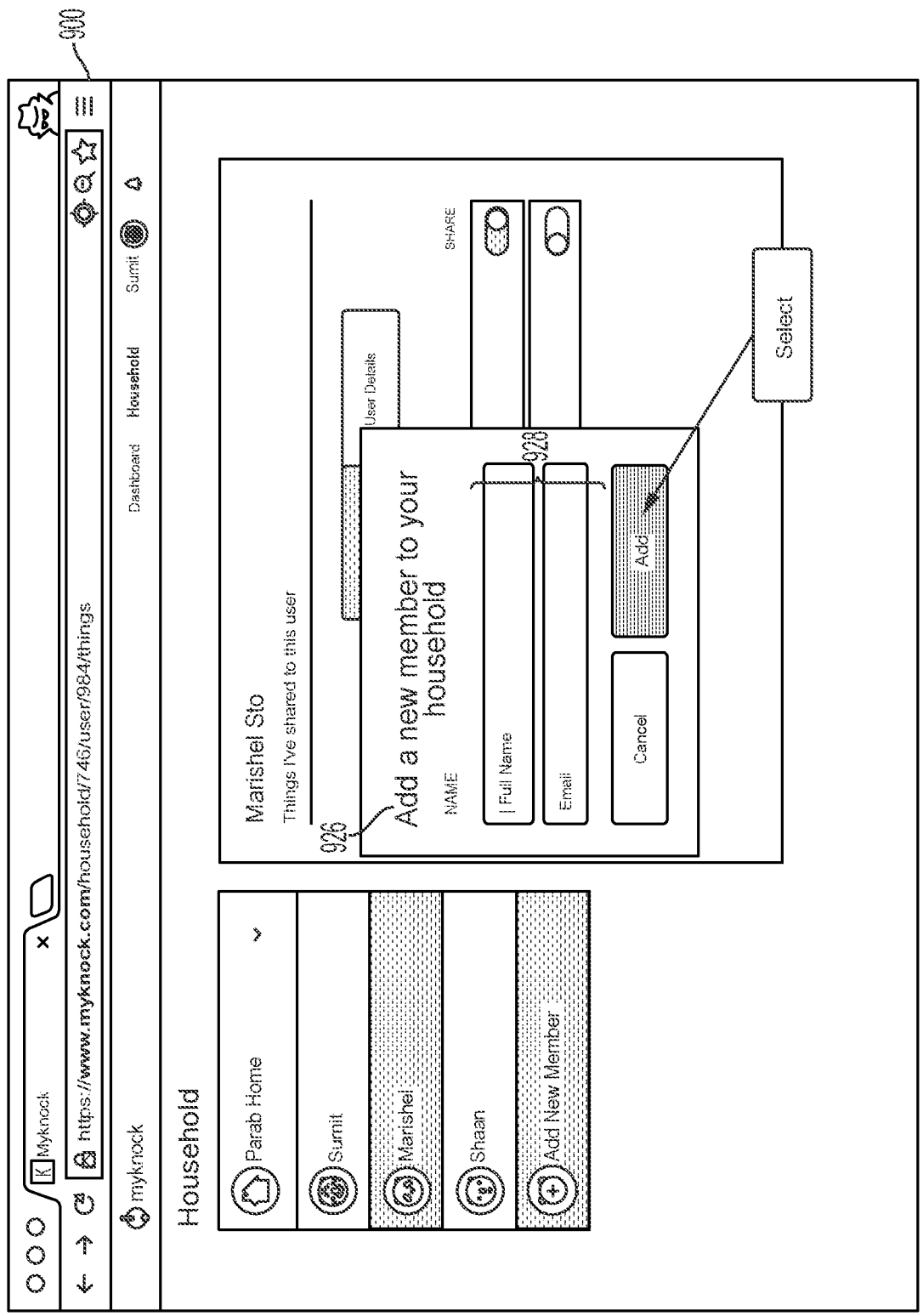
FIG. 23 is a screen shot of an example of a user interface for adding a new member to a group.

FIGS. 22 and 23 illustrate group management. In FIG. 22 it can be seen that by selecting a drop-down menu option under Parab Home, the user can select other groups (if applicable), and/or create new groups by selecting a Create New Household option 922. Moreover, the user can select an Add New Member option 924 to add a new member to the currently viewed group. FIG. 23 illustrates a new member dialog 926 that is displayed upon selecting the Add New Member option 924. Entry boxes 928 are provided to enable the new member's name and email address to be entered, in order to send a sub-user invitation, as discussed above.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the platform 10, any component of or related to the platform 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for delegating entitlements to media services, the method comprising:
obtaining, at an intermediary system operable between a service provider and a plurality of user devices from a first user of a first user device of the plurality of user devices, credentials of the first user that are known to the service provider for authorizing access to a media service of the service provider;
in response to receiving the credentials from the first user, using, by the intermediary system, the credentials to obtain from the service provider an electronic token authorizing access to the media service of the service provider;

storing, at the intermediary system the electronic token to enable the intermediary system to access the media service from the service provider on behalf of the first user;

after detecting a request to access the media service by a second user, using, by the intermediary system, a set of stored associations to determine that the second user has been delegated an entitlement to the media service by the first user; and after determining that the second user has been delegated the entitlement, using, by the intermediary system, the electronic token stored at the intermediary system to access the media service from the service provider for use by the second user, via a communication interface between the intermediary system and the service provider.

2. The method of claim 1, wherein the communication interface between the intermediary system and the service provider comprises at least one of a programming interface provided at least in part by the service provider, and a service application module (SAM) provided by the intermediary system.

3. The method of claim 1, wherein the second user is associated with a group created by the first user.

4. The method of claim 1, wherein the set of stored associations further comprises at least one association between the second user and a device capable of consuming the media service.

5. The method of claim 4, wherein the at least one association comprises a restriction on a type or number of devices that can be used.

6. The method of claim 1, wherein the request to access the media service is received from an application on an electronic device associated with the second user, the application providing access to at least some features for the media service transparently to the media service.

7. The method of claim 1, further comprising:
using a bi-directional messaging system to have delegations and revocations carried out in a real time manner.

8. The method of claim 1, further comprising:
providing, by the intermediary system, feature-level access control of the media service.

9. The method of claim 8, wherein the set of stored associations indicate that the second user has been delegated, by the first user, the entitlement to only a subset of all features of the media service, and wherein the feature-level access control of the media service is provided by:
using, by the intermediary system, the electronic token to access all features of the media service, via the communication interface between the intermediary system and the service provider, and
filtering, by the intermediary system, all features of the media service to the subset of all features of the media service for enabling the second user to only use the subset of all features of the media service to which the second user is entitled.

10. A non-transitory computer readable medium comprising computer executable instructions executed by a processor for performing a method for delegating entitlements to media services, the method comprising:
obtaining, at an intermediary system operable between a service provider and a plurality of user devices from a first user of a first user device of the plurality of user devices, credentials of the first user that are known to the service provider for authorizing access to a media service of the service provider;

in response to receiving the credentials from the first user, using, by the intermediary system, the credentials to obtain from the service provider an electronic token authorizing access to the media service of the service provider;

storing, at the intermediary system the electronic token to enable the intermediary system to access the media service from the service provider on behalf of the first user;

after detecting a request to access the media service by a second user, using, by the intermediary system, a set of stored associations to determine that the second user has been delegated an entitlement to the media service by the first user; and after determining that the second user has been delegated the entitlement, using, by the intermediary system, the electronic token stored at the intermediary system to access the media service from the service provider for use by the second user, via a communication interface between the intermediary system and the service provider.

11. The non-transitory computer readable medium of claim 10, wherein the communication interface between the intermediary system and the service provider comprises at least one of a programming interface provided at least in part by the service provider, and a service application module (SAM) provided by the intermediary system.

12. The non-transitory computer readable medium of claim 10, wherein the second user is associated with a group created by the first user.

13. The non-transitory computer readable medium of claim 10, wherein the set of stored associations further comprises at least one association between the second user and a device capable of consuming the media service.

14. The non-transitory computer readable medium of claim 13, wherein the at least one association comprises a restriction on a type or number of devices that can be used.

15. The non-transitory computer readable medium of claim 10, wherein the request to access the media service is received from an application on an electronic device associated with the second user, the application providing access to at least some features for the media service transparently to the media service.

16. The non-transitory computer readable medium of claim 10, further comprising instructions for:
using a bi-directional messaging system to have delegations and revocations carried out in a real time manner.

17. An intermediary system operable between a service provider and a plurality of user devices, comprising:
a memory storing instructions; and
a processor coupled to the memory for executing the instructions to perform a method comprising:
obtaining, at the intermediary system from a first user of a first user device of the plurality of user devices, credentials of the first user that are known to the service provider for authorizing access to a media service of the service provider;
in response to receiving the credentials from the first user, using, by the intermediary system, the credentials to obtain from the service provider an electronic token authorizing access to the media service of the service provider;

storing, at the intermediary system the electronic token to enable the intermediary system to access the media service from the service provider on behalf of the first user;

after detecting a request to access the media service by a second user, using, by the intermediary system, a set of stored associations to determine that the second user has been delegated an entitlement to the media service by the first user; and after determining that the second user has been delegated the entitlement, using, by the intermediary system, the electronic token stored at the intermediary system to access the media service from the service provider for use by the second user, via a communication interface between the intermediary system and the service provider.

* * * * *

UNITED STATES PATENT AND TRADEMARK OFFICE
CERTIFICATE OF CORRECTION

PATENT NO. : 10,757,165 B2  
APPLICATION NO. : 15/179628  
DATED : August 25, 2020  
INVENTOR(S) : Praveen Gangadharan et al.

Page 1 of 1

It is certified that error appears in the above-identified patent and that said Letters Patent is hereby corrected as shown below:

In the Claims

Column 21, Line 4 Claim 1, please replace "system the" with --system, the--

Column 22, Line 8 Claim 10, please replace "system the" with --system, the--

Signed and Sealed this  
Sixth Day of January, 2026

John A. Squires  
*Director of the United States Patent and Trademark Office*